United States Patent
Krishnamurthy et al.

(10) Patent No.: US 11,596,895 B2
(45) Date of Patent: Mar. 7, 2023

(54) RADIAL ADSORBER, ADSORPTION SYSTEM, AND ADSORPTION METHODS

(71) Applicant: Air Products and Chemicals, Inc., Allentown, PA (US)

(72) Inventors: Gowri Krishnamurthy, Sellersville, PA (US); Nasim Ul Hassan Malik, London (GB); Edward Landis Weist, Jr., Macungie, PA (US); King Wai Hung, Surrey (GB)

(73) Assignee: Air Products and Chemicals, Inc., Allentown, PA (US)

( * ) Notice: Subject to any disclaimer, the term of this patent is extended or adjusted under 35 U.S.C. 154(b) by 316 days.

(21) Appl. No.: 16/931,507

(22) Filed: Jul. 17, 2020

(65) Prior Publication Data
US 2022/0016565 A1   Jan. 20, 2022

(51) Int. Cl.
*B01D 53/04* (2006.01)
*B01D 53/047* (2006.01)

(52) U.S. Cl.
CPC ..... *B01D 53/0431* (2013.01); *B01D 53/0446* (2013.01); *B01D 53/047* (2013.01); *B01D 53/0462* (2013.01); *B01D 2259/402* (2013.01); *B01D 2259/40086* (2013.01)

(58) Field of Classification Search
CPC .. B01D 53/04; B01D 53/047; B01D 53/0431; B01D 53/0446; B01D 53/0462; B01D 53/053; B01D 2259/40086; B01D 2259/402; B01D 2259/403; B01D 2259/4145; B01D 2259/4146

USPC ........ 95/90, 96, 148; 96/108, 121, 132, 137, 96/139, 149, 152

See application file for complete search history.

(56) References Cited

U.S. PATENT DOCUMENTS

| | | | |
|---|---|---|---|
| 2,430,861 A | 11/1947 | Carpenter | |
| 2,698,061 A | 12/1954 | Jaubert | |
| 4,259,097 A * | 3/1981 | Patel ................. | B01D 46/2411 137/543.17 |
| 4,372,920 A * | 2/1983 | Zardi .................. | B01J 8/0415 422/607 |
| 4,451,369 A * | 5/1984 | Sekino ................ | B01D 53/22 210/336 |
| 4,472,178 A | 9/1984 | Kumar et al. | |
| 4,541,851 A | 9/1985 | Bosquain et al. | |
| 4,544,384 A * | 10/1985 | Metschl ............... | B01J 8/0415 96/130 |
| 4,698,072 A * | 10/1987 | Rohde ................. | B01J 8/0415 95/143 |
| 4,784,672 A | 11/1988 | Sircar | |

(Continued)

FOREIGN PATENT DOCUMENTS

| | | |
|---|---|---|
| CA | 2357276 A1 | 3/2002 |
| CN | 104772004 A | 7/2015 |

(Continued)

*Primary Examiner* — Frank M Lawrence, Jr.
(74) *Attorney, Agent, or Firm* — Matthew Richard Weaver

(57) ABSTRACT

A radial adsorber can be configured to facilitate utilization of different layers of material. The radial adsorber, system using at least one radial adsorber, and methods of utilizing embodiments of the radial adsorber can help permit improved efficient operation of fluid purification processing while also being configured to minimize, if not fully avoid, being susceptible to the effect of fluidization.

18 Claims, 11 Drawing Sheets

(56) References Cited

U.S. PATENT DOCUMENTS

| | | | |
|---|---|---|---|
| 5,078,876 A * | 1/1992 | Whittier | B01D 61/08 210/295 |
| 5,232,479 A * | 8/1993 | Poteau | B01J 8/0469 55/475 |
| 5,759,242 A | 6/1998 | Smolarek et al. | |
| 5,846,295 A | 12/1998 | Kalbassi et al. | |
| 5,917,136 A | 6/1999 | Gaffney et al. | |
| 6,086,659 A * | 7/2000 | Tentarelli | B01J 8/0411 96/151 |
| 6,152,991 A | 11/2000 | Ackley | |
| 6,224,764 B1 * | 5/2001 | Matyushin | A61L 2/16 210/283 |
| 6,506,236 B2 | 1/2003 | Golden et al. | |
| 6,599,347 B2 | 7/2003 | Kalbassi et al. | |
| 6,866,075 B2 | 3/2005 | Whitley et al. | |
| 7,022,159 B2 | 4/2006 | Kalbassi et al. | |
| 7,285,154 B2 | 10/2007 | Karwacki, Jr. et al. | |
| 7,413,595 B2 | 8/2008 | Schmidt et al. | |
| 8,206,669 B2 | 6/2012 | Schaffer et al. | |
| 8,262,783 B2 | 9/2012 | Stoner et al. | |
| 8,268,044 B2 | 9/2012 | Wright et al. | |
| 8,404,024 B2 | 3/2013 | Henderson et al. | |
| 8,518,356 B2 | 8/2013 | Schaffer et al. | |
| 8,743,571 B2 | 6/2014 | Yamada et al. | |
| 8,814,985 B2 | 8/2014 | Gerds et al. | |
| 9,108,145 B2 | 8/2015 | Kalbassi et al. | |
| 9,199,190 B2 | 12/2015 | Malik et al. | |
| 9,631,864 B2 | 4/2017 | Chen et al. | |
| 9,731,241 B2 | 8/2017 | Kalbassi et al. | |
| 2011/0206581 A1 | 8/2011 | Ackley et al. | |
| 2011/0219950 A1 | 9/2011 | Rodrigues et al. | |
| 2018/0169566 A1 | 6/2018 | Burns et al. | |
| 2019/0291078 A1 | 9/2019 | Weist, Jr. et al. | |

FOREIGN PATENT DOCUMENTS

| | | |
|---|---|---|
| CN | 109821355 A | 5/2019 |
| DE | 521649 C | 3/1931 |
| EP | 0118349 A1 | 9/1984 |
| EP | 3526343 A1 | 2/1993 |
| FR | 2830462 A1 | 4/2003 |
| JP | 5237327 A | 9/1993 |
| KR | 1019910005985 | 8/1991 |
| KR | 1020010067128 | 7/2001 |
| KR | 1020150003391 | 1/2015 |

\* cited by examiner

RADIAL ADSORBER, ADSORPTION SYSTEM, AND ADSORPTION METHODS

FIELD OF THE INVENTION

The present innovation relates to adsorbers, radial adsorbers, adsorption systems utilizing radial adsorbers and methods of making and using the same.

BACKGROUND OF THE INVENTION

Thermal Swing Adsorption (TSA) is frequently used alongside technology like Pressure Swing Adsorption (PSA) as pre-purification to air cryogenic distillation processes. Often process are a combination of TSA and PSA processes (TPSA) using both pressure and temperature to regenerate absorbent beds. The adsorption system's function is to remove components with high freezing point such as ambient moisture and carbon dioxide which would otherwise freeze out in downstream processing, causing operability issue like blockage. Nitrous oxide, hydrocarbons, and other impurities can also be removed via front-end purification to avoid these impurities from accumulating in downstream processes.

Historically, adsorber vessels come in three different common configurations: vertical, horizontal and radial. Examples of these types of adsorbers can be appreciated from U.S. Pat. Nos. 4,472,178, 4,541,851, 4,784,672, 5,759,242, 5,846,295, 5,917,136, 6,086,659, 6,152,991, 6,506,236, 6,599,347, 6,866,075, 7,022,159, 7,285,154, 7,413,595, 8,206,669, 8,262,783, 8,268,044, 8,404,024, 8,518,356, 8,734,571, 8,814,985, 9,108,145, 9,199,190, 9,631,864, and 9,731,241, U.S. Pat. App. Pub. Nos. 2011/0206581, 2011/0219950 and 2019/0291078 and Canadian Patent Publication No. 2,357,276 A.

The selection on the type of adsorber vessel to use for a particular process can be heavily dependent on the process duty against the flow passage surface area within the vessel. The flow passage surface area on the other hand is impacted by the vessel dimensions, which may be constrained by manufacturing and transportation limitations, based on project and manufacturer locations.

Vertical and horizontal vessels have more simplistic designs than a typical radial adsorber. However, the adsorbent within these two types of vessels are susceptible to the effect of fluidization.

In contrast, the radial adsorber does not usually share this concern. Unlike the vertical and horizontal beds where process fluid typically enters from the inlet of the vessel and exits through the outlet of the vessel, the process fluid enters the radial bed from an outer annulus and the fluid flows in a radial direction into the vessel's axis, or from an inner channel and the fluid flows to the vessel shell, passing through adsorbent layers where separation takes place. As adsorbent is packed in designated containment space by filling these compartments completely, the possibility of fluidization and bead rolling effect is effectively removed. In conventional radial adsorbers, specialized bed supports and vessel heads are an essential addition to the vessel of the radial configuration in their roles in securing the above mentioned adsorbent compartments. Further, adsorbent needs to be loaded effectively into the compartments. These components, together with the need for multiple adsorbents in some processes, adds to the vessel's complexity and cost.

SUMMARY

We have determined that radial adsorbers with multiple adsorbent layers (e.g. two or more layers) within the same radial adsorber can have design complexity and cost implications. We have also determined that the use of three or more layers within a bed of a radial adsorber has often been avoided in the art because, as the number of different material layers increases, there may not be enough space for the respective layers to achieve their minimum layer length/residence time for contact time to provide sufficient adsorption of a target material from the fluid.

In contrast to multiple layered adsorbent beds for vertical and horizontal configurations, radial adsorbers have a more complicated design for the radial bed as each layer of material can be separated by mechanical screens that are subjected to stress from multiple directions. The number of screens has a cost and complexity implication. For instance, we have found that an important consideration when designing radial adsorbers is addressing stresses that act upon the screen due to thermal variation. Another issue that we have identified is that, as the number of layers increases, a residence time of flow with a particular layer may be unable to effectively treat fluid passed through the layer due to the change in layer dimension (and residence time) that may be required to accommodate the additional layer(s).

Further, the greater the number of screens that are included can increase the design complexity to account for loading, manufacturing and operation. We have found that such factors can impact the cost of owning and operating radial adsorbers due to their complex design criteria. For example, we have found that the design and operational complexity can be greatly increased when adsorbers have three or more layers of material (e.g. adsorbent material). Due to the design complexity, the loading and/or replacement of layers of material can be a complex process requiring a significant amount of time and work due to how the layers can be arranged in a vessel of the adsorber. This can have significant effects on the operational costs of the adsorbers due to the time and effort involved in this work and the longer period of time in which an adsorber may have to be off-line for this work to be performed.

We provide embodiments of a radial adsorber that can include a vessel having a chamber, an inlet in fluid communication with the chamber and an outlet in fluid communication with the chamber. There can also be layers of material within the chamber. For instance, the layer of material can include a first layer of material that can be positioned adjacent to a second layer of material within the chamber. The first layer of material can include a first material and the second layer of material can include a second material that is different from the first material. The vessel can also have at least one flow guiding structure defined within or positioned within the chamber for guiding fluid within the chamber and through the layers of material (e.g. the first layer of material and the second layer of material, etc.). The at least one flow guiding structure can be configured so that the fluid passes from an outer region of the chamber to an inner region of the chamber to pass through the layers of material and/or pass from the inner region to the outer region to pass through the layers of material.

In some embodiments, an adsorber can have a vessel that is configured so that there is a Z flow of fluid with two or more stacked layers (e.g. first and second layers of material that are stacked layers of material). Each stacked layer can be positioned so flow for fluid within the vessel chamber moves in only a radial direction or the flow path is substantially a flow of fluid that moves radially (e.g. 80-90% of the flow path of the fluid or more than 80% or more than 90% of the flow path moves radially). FIG. 2-7 illustrate exemplary embodiments of such vessel configurations. As may be appreciated from FIGS. 2-7, each stacked layer of material can have one or more concentric sub-layers of material (e.g. one or more sub-layers of adsorbent material). FIGS. 2-5 illustrate examples of two stacked layers of material that each have one adsorbent sub-layer. FIGS. 6-7 illustrate exemplary embodiments that have two stacked layers, the first with two concentric adsorbent sub-layers and the second with one sub-layer. Other embodiments can utilize more than two layers and/or can utilize layers that have more than two sub layers (e.g. three sublayers, etc.).

Other embodiments of the adsorbers can be configured so that there is a Z flow path of fluid within the chamber and that utilize two or more stacked layers (e.g. the first and second layers of material are stacked layers of material) in which the flow path of fluid through the chamber of the vessel includes a combination of radial and axial flow segments (e.g. at least one radial flow segment and at least one axial flow segment of the flow path). FIGS. 8 and 9 illustrate examples of such an adsorber configuration. At least one stacked layer can have flow in radial direction (e.g. a direction along a radius of the vessel) and at least one stacked layer can have flow in an axial direction (e.g. a vertical direction that is transverse or perpendicular to the radial flow direction). Each stacked layer could have additional sub-layers.

In some embodiments of the radial adsorber, the at least one flow guiding structure can include one or more of:
(i) a first inner conduit positioned to receive fluid from the inlet and guide the fluid to an inner side of the first layer of material and a first outer conduit positioned to receive fluid from an outer side of the first layer of material to guide the fluid to an outer side of the second layer of material;
(ii) a first inner conduit positioned to receive fluid from the inlet and guide the fluid to an inner side of the first layer of material and a first outer conduit positioned to receive fluid from an outer side of the first layer of material to guide the fluid to an outer side of the second layer of material, and a second inner conduit positioned to receive fluid from an inner side of the second layer of material to guide the fluid to the outlet of the vessel;
(iii) a first outer conduit positioned to receive fluid from the inlet and guide the fluid to an outer side of the first layer of material and a first inner conduit positioned to receive fluid from an inner side of the first layer of material to guide the fluid to an inner side of the second layer of material; and
(iv) a first outer conduit positioned to receive fluid from the inlet and guide the fluid to an outer side of the first layer of material, a first inner conduit positioned to receive fluid from an inner side of the first layer of material to guide the fluid to an inner side of the second layer of material, and a second outer conduit positioned to receive fluid from an outer side of the second layer of material and guide the fluid to the outlet of the vessel.

Some embodiments of the radial adsorber can have at least one flow guiding structure that includes only (i), only (ii), only (iii) or only (iv). Other embodiments can utilize a combination of (i), (ii), (iii), and (iv). In some embodiments, the flow of fluid through the first layer of material can include passing through multiple sublayers of different material. For example, the first layer of material can include a first sublayer having the first material and a second sublayer having a third material that differs from the first material and also differs from the second material of the second layer of material. The fluid can pass through the first and second sublayers of the first layer of material when passing through the first layer of material. As an alternative, some embodiments can have a second layer of material that includes sublayers of material. For example, the second layer of material can include a first sublayer having the second material and a second sublayer having a third material that differs from the first material of the first layer of material and also differs from the second material of first sublayer of the second layer of material. The fluid can pass through the first and second sublayers of material when passing through the second layer of material.

In yet other embodiments, the first and second layers of material can each have sublayers of material. For example, the first layer of material can include a first sublayer having the first material and a second sublayer having a third material that differs from the first material of the first sublayer of material and also differs from the second material of a first sublayer of the second layer of material. These sublayers can be immediately adjacent to each other so that the fluid can pass through the first sublayer and then pass through the second sublayer of material (e.g. pass through the first and third material of those sublayers) when passing through the first layer of material. The second layer of material can also include sublayers such as a first sublayer that includes the second material and a second sublayer that includes a fourth material. The fourth material may differ from the first material, second material, and third material. These sublayers can also be immediately adjacent to each other so that fluid that passes through the second layer of material can pass through the first sublayer of the second layer of material and then pass through the second sublayer of the second layer of material (e.g. pass through the second and fourth material of the sublayers of the second layer of material) as the fluid is passed through the second layer of material.

Some embodiments of the radial adsorber can include a third layer of material including a third material. The third material can differ from the first material and the third material can also differ from the second material. In yet other embodiments, there can be more than three layers of material. The material for the layers of material or sublayers of one or more layers of material can be a combination of the following in some embodiments: a molecular sieve, alumina, silica (e.g. silica gel), metal oxides, copper oxide-manganese oxide mixtures for carbon monoxide and hydrogen gas removal ($CO/H_2$ removal), an adsorbent material or absorbent material (e.g. a catalyst) to remove nitrous oxide, an adsorbent material or absorbent material (e.g. a catalyst) to remove carbon monoxide, an adsorbent material or absorbent material (e.g. a catalyst) to remove carbon dioxide, an adsorbent material or absorbent material (e.g. a catalyst) to remove hydrogen, or an adsorbent material or absorbent material (e.g. a catalyst) to remove other target element or combination of target elements from a fluid (e.g. a gas having a mixture of gaseous compounds, air, etc.) passed through the layers. Each layer of material and/or each sublayer of a layer of material can include different material for removal of one or more different target elements of target compounds (e.g. CO, $H_2$, water, etc.). The material of each of the layers can be solid particulate material having pores for facilitating adsorbing and/or absorbing one or more materials from a fluid (e.g. a gas) pass through the material.

In embodiments of the radial adsorber that use three or more layers of material, the at least one flow guiding structure can include: (i) a first inner conduit positioned to receive fluid from the inlet and guide the fluid to an inner side of the first layer of material and a first outer conduit positioned to receive fluid from an outer side of the second layer of material to guide the fluid to an outer side of the third layer of material; or (ii) a first outer conduit positioned to receive fluid from the inlet and guide the fluid to an outer side of the first layer of material and a first inner conduit positioned to receive fluid from an inner side of the second layer of material to guide the fluid to an inner side of the third layer of material.

In some embodiments of the adsorber that include (ii) the first outer conduit positioned to receive fluid from the inlet and guide the fluid to the outer side of the first layer of material, the first inner conduit positioned to receive fluid from the inner side of the second layer of material to guide the fluid to the inner side of the third layer of material, the at least one flow guiding structure can also include a second outer conduit positioned to receive fluid from the outer side of the third layer of material and guide the fluid to the outlet of the vessel.

In some embodiments, the third layer of material can be retained within a conical receptacle. The inner side of the third layer can be smaller in size than an outer side of the third layer of material.

In some embodiments, a radial adsorber can include a vessel having a chamber, an inlet in fluid communication with the chamber and an outlet in fluid communication with the chamber. There can also be layers of material positioned in the chamber. The layers of material can include a first layer of material positioned adjacent to a second layer of material within the chamber. The first layer of material can include a first material and the second layer of material can include a second material that is different from the first material. The vessel can also have at least one flow guiding structure defined within or positioned within the chamber for guiding fluid within the chamber and through the layers of material. The at least one flow guiding structure can be configured so that the fluid passes through the chamber along a flow path. The flow path that is defined can include one of the following options for the flow of fluid when the adsorber is in an on-stream state:

(i) flowing from the inlet to an outer region of the chamber to flow from the outer region of the chamber to an inner region of the chamber by passing through the first layer of material in a first radial direction and then passing from the inner region to the outer region of the chamber to pass through the second layer of material in a second radial direction before passing out of the chamber via the outlet;

(ii) flowing from the inlet to the inner region to flow from the inner region to the outer region by passing through the first layer of material in a first radial direction and then passing from the outer region to the inner region to pass through the second layer of material in a second radial direction before passing out of the chamber via the outlet;

(iii) flowing from the inlet to the outer region of the chamber to flow from the outer region of the chamber to the inner region of the chamber by passing in a first radial direction through the first layer of material and also through the second layer of material and then passing from the inner region to the outlet by passing through a third layer of material positioned in the chamber downstream of the first and second layers in an axial flow direction that is perpendicular or transverse to the radial direction;

(iv) flowing from the inlet to the inner region to flow from the inner region to the outer region by passing in a first radial direction through the first layer of material and also through the second layer of material and then passing from the outer region toward the outlet by passing through a third layer of material in a second radial direction, the third layer of material being positioned within the chamber downstream of the first and second layers of material; and (v) flowing from the inlet to the outer region of the chamber to flow from the outer region of the chamber to the inner region of the chamber by passing in a first radial direction through the first layer of material and also through the second layer of material and then passing from the inner region toward the outlet by passing through a third layer of material in a second radial flow direction, the third layer of material being positioned in the chamber downstream of the first and second layers of material.

Methods of passing fluid through the radial adsorber can also utilize these flow paths for passing the fluid through layers of material within the chamber of the adsorber vessel. Other embodiments can include an arrangement of at least one flow guiding structure to define other types of flow paths within the chamber as well.

Embodiments of the radial adsorber that include three or more layers can include a first flow bypass prevention mechanism positioned between the third layer of material and the first layer of material and/or a second flow bypass prevention mechanism positioned between the third layer of material and the second layer of material. The first flow bypass prevention mechanism can include at least one first spring and a first extendable member to define at least a portion of a first compartment. The at least one first spring can be positioned in the first compartment. A first end of the first spring can engage and/or contact the first layer of material and a second end of the first spring can engage and/or contact the third layer of material so that the first extendable member extends via the at least one first spring in response to a settlement effect resulting from the first material and/or the third material becoming more densely packed as a result of fluid being passing through the first layer of material and the third layer of material. The second flow bypass prevention mechanism can include at least one second spring and a second extendable member to define at least a portion of a second compartment. The at least one second spring can be positioned in the second compartment. A first end of the second spring can engage and/or contact the second layer of material and a second end of the spring can engage and/or contact the third layer of material so that the second extendable member extends via the at least one second spring in response to a settlement effect resulting from the second material and/or the third material becoming more densely packed as a result of fluid being passing through the second layer of material and the third layer of material.

In embodiments of the radial adsorber that utilize at least the first and second layers of material the adsorber can include a first flow bypass prevention mechanism positioned between the first layer of material and the second layer of material. The first flow bypass prevention mechanism can include at least one spring and a first extendable member positioned to at least partially define a compartment. The at least one spring can be positioned in the compartment. A first end of each spring can contact and/or engage the first layer of material and a second end of the spring can contact and/or engage the second layer of material so that the first extendable material extends via the at least one spring in response to a settlement effect resulting from the first material and/or the second material becoming more densely packed as a result of fluid being passing through the first layer of material and the second layer of material.

An adsorption system is also provided. Embodiments of the adsorption system can include a first adsorber and a second adsorber arranged to operate in parallel so that when the first adsorber is in an on-stream state the second adsorber is in an off-stream state and when the second adsorber is in an on-stream state, the first adsorber is in an off-stream state. The first adsorber can be configured to purify fluid passed through the first adsorber when in the on-stream state of the first adsorber. The first adsorber can also be configured to receive a regeneration flow of fluid to undergo adsorbent regeneration when in the off-stream state of the first adsorber. The second adsorber can be configured to purify fluid passed through the second adsorber when in the on-stream state of the second adsorber and can be configured to receive a regeneration flow of fluid to undergo adsorbent regeneration when in the off-stream state of the second adsorber. The first adsorber and the second adsrober can each be an embodiment of a radial adsorber that includes two or more layers of material (e.g. at least the first and second layers of material) and at least one flow guiding structure within a chamber of a vessel. Each of the radial adsorbers can also include at least one flow bypass prevention mechanism. Each flow bypass prevention mechanism can be connected between different layers of material.

Embodiments of a plant are also provided. Embodiments of the plant can include embodiments of the adsorption system, which can utilize at least one embodiment of the radial adsorber. Embodiments of the plant can also include other structures and mechanisms, such as automated process control equipment, a compressor for compressing the fluid to feed the fluid to the adsorption system, coolers, heat exchangers, conduit structures, vessels, and fluid processing devices, as well as other plant elements.

Embodiments of a method of passing a fluid through a radial adsorber are also provided. Embodiments of the method can include:
(a) passing fluid from an inlet of a vessel of a radial adsorber to one of:
  (i) a first inner conduit positioned to receive fluid from the inlet so the first inner conduit guides the fluid to an inner side of a first layer of material within the vessel, and
  (ii) a first outer conduit positioned to receive fluid from the inlet and guide the fluid to an outer side of a first layer of material positioned within the vessel;
(b) passing fluid through the first layer of material;
(c) passing the fluid within the vessel from the first layer of material so the fluid is passed from one of:
  (i) an inner side of the first layer of material to an inlet opening of a first inner conduit within the vessel, and
  (ii) the first layer of material to a second layer of material within the vessel for being passed through the second layer of material to an inlet opening of a first inner conduit within the vessel;
  (iii) the first layer of material to a second layer of material within the vessel for being passed through the second layer of material to an inlet opening of a first outer conduit within the vessel; and
  (iv) an outer side of the first layer of material to an inlet opening of a first outer conduit within the vessel; and
(d) guiding the fluid so that one of:
  (i) the fluid is passed from the first inner conduit to a second layer of material within the vessel,
  (ii) the fluid is passed from the first inner conduit to a third layer of material within the vessel, and
  (iii) the fluid is passed from the first outer conduit to an outer side of a second layer of material within the vessel for being passed through the second layer of material, and
  (iv) the fluid is passed from the first outer conduit to a third layer of material for being passed through the third layer of material; and
(e) passing the fluid out of an outlet of the vessel after the fluid has passed through at least the first layer of material and the second layer of material.

Embodiments of the method can be configured so that fluid is passed through the vessel so that there is a Z flow of fluid with two or more stacked layers (e.g. first and second layers of material that are stacked layers of material). The fluid can be passed through the vessel chamber so the fluid only moves in a radial direction or the flow path is substantially a flow of fluid that moves radially (e.g. 80-90% of the flow path of the fluid or more than 80% or more than 90% of the flow path moves radially).

Other embodiments of the method can be configured so that there is a Z flow path of fluid within the chamber of an adsorber that utilizes two or more stacked layers (e.g. the first and second layers of material are stacked layers of material) in which there is a combination of radial flow and axial flow of the flow path of fluid within the chamber of the vessel. At least one stacked layer can be arranged so that there is at least one flow segment of the flow path in which fluid flows in a radial direction (e.g. a direction along a radius of the vessel) for passing fluid through that layer and at least one stacked layer can be arranged so that there is at least one flow segment of the fluid flow path that flows fluid in an axial direction (e.g. a vertical direction that is transverse or perpendicular to the radial flow direction) for passing through that layer. Each stacked layer could have multiple sub-layers or just have a single sub-layer.

Other details, objects, and advantages of our adsorbers, radial adsorbers, systems utilizing radial adsorbers and methods of making and using the same will become apparent as the following description of certain exemplary embodiments thereof proceeds.

BRIEF DESCRIPTION OF THE DRAWINGS

Exemplary embodiments of adsorbers, radial adsorbers, systems utilizing radial adsorbers and methods of making and using the same are shown in the drawings included herewith. It should be understood that like reference characters used in the drawings may identify like components.

DETAILED DESCRIPTION

Figure 1:
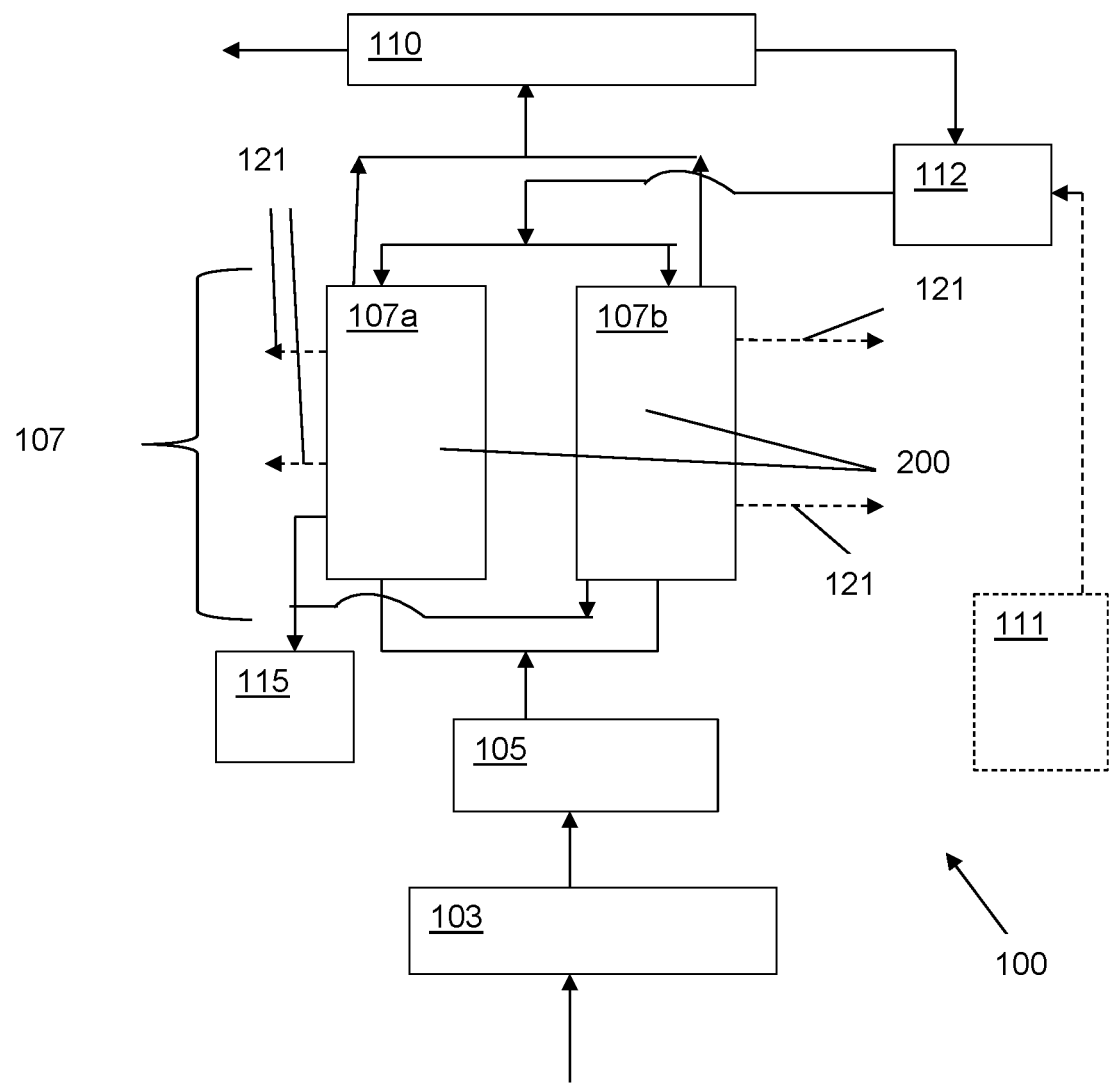
FIG. 1 is a box diagram of an exemplary embodiment of a plant utilizing an exemplary embodiment of an adsorber system.

Referring to FIGS. 1-11, a plant 100 can be configured as a cryogenic air distillation system for generation of one or more output flows for providing one or more desired products (e.g. oxygen gas, nitrogen gas, argon gas, etc.). In other embodiments, the plant can be configured to process other fluid to generate one or more other desired product flows.

The plant 100 can be configured to include an adsorption system 107, which can include a system of adsorbers 200. The adsorbers 200 of the adsorption system 107 can include a first adsorber 107a and a second adsorber 107b. Any number of additional adsorbers may be present. The first and second adsorbers 107a and 107b can be configured as radial adsorbers. The adsorption system 107 can utilize an arrangement of adsorbers 200 so they are configured to utilize a thermal swing adsorption process (e.g. a TSA or TPSA process) and/or a pressure swing adsorption process or any other process known in the art.

Each adsorber of the adsorption system 107 can include layers of adsorbent material. Each adsorber of the adsorption system can also include one or more layers of material that can remove one or more target elements from a fluid via absorption (e.g. catalyst material).

The first and second radial adsorbers 107a and 107b can be arranged within the adsorption system 107 so that they operate in parallel. When the first adsorber 107a is on-stream carrying out purification processes by adsorbing one or more target materials from a fluid flow fed to the adsorption system 107, the second adsorber 107b can be off-stream for purification so that it can undergo regeneration for regeneration of the adsorbent bed of the adsorber. Additionally, when the second adsorber 107b is on-stream carrying out purification processes by adsorbing one or more target materials from a fluid flow fed to the adsorption system 107, the first adsorber 107a can be off-stream so it can undergo regeneration for regeneration of the adsorbent bed of the adsorber. The adsorption system 107 can be configured so that the input of fluid into the first or second adsorber is changed (e.g. via valve position changes, etc.) to switch the parallel adsorbers between their on-stream states and their off-stream states (e.g. when the first adsorber is on-stream, the second adsorber can be off-stream and vice versa).

In some embodiments, there can be multiple first adsorbers that may work in series and also multiple second adsorbers that work in series or in another type of arrangement for purification of a fluid. This can be appreciated from the schematically representation provided in FIG. 1's schematic illustration of the first and second adsorbers 107a and 107b. For such embodiments, the multiple first adsorbers can be arranged so that fluid is passed through each first adsorber one after the other or so that split portions of the fluid to be purified via adsorption system 107 is passed through respective first adsorbers when they are in their on-stream state. Similarly, the multiple second adsorbers can be arranged so that fluid is passed through each second adsorber one after the other or so that split portions of the fluid to be purified via adsorption system 107 is passed through respective second adsorbers when they are in their on-stream state. Such arrangements of first and second adsorbers 200 can be configured to permit first adsorbers to be in an on-stream state while second adsorbers are in an off-stream state and vice versa.

Each adsorber 200 of the adsorption system 107 (e.g. first adsorber 107a, second adsorber 107b, etc.) can include a bed of material retained within a vessel that are layered with adsorbent. A first adsorbent layer of a first bed can be configured via composition and/or structure to selectively remove ambient moisture and a second adsorbent layer of the first bed can be configured via composition and/or structure to selectively remove carbon dioxide ($CO_2$), nitrogen oxide ($N_2O$), heavy hydrocarbons and/or other fluid constituents from a fluid (e.g. an air feed) fed to the adsorption system 107 when the adsorber 200 is in the on-stream state.

Each adsorber 200 can also include at least one flow bypass prevention mechanism 900 positioned within the chamber of the vessel 301 of the adsorber between adjacent layers of material. The flow bypass prevention mechanism 900 can be configured to improve efficiency of the operation of the adsorber and help avoid a portion of the fluid passing through the vessel bypassing material positioned in the chamber of the vessel.

It should be appreciated that when an adsorber 200 is in an off-stream state, it can undergo a regeneration process to regenerate the one or more layers of material within the adsorber. When returned to the on-stream state, the adsorber can operate with improved efficiency than prior to regeneration due to the regeneration of the one or more layers of material (e.g. adsorbent material) as the regeneration of the material can return that material to a condition that is close to or at its original state for adsorption of target material from a fluid flow.

For at least some embodiments, the flow of regeneration fluid can pass through the vessel of an absorber 200 along a flow path that is the reverse of the flow path of fluid passed through the vessel of the adsorber when the adsorber is in the on-stream state. For such embodiments, the inlet 202 of the vessel during the on-stream state may function as an outlet for the regeneration fluid and the outlet 210 of the vessel during the on-stream state may function as an inlet for the regeneration fluid.

The adsorption system 107 can be configured to receive an input stream via at least one conduit to undergo purification (e.g. via adsorption) from at least one upstream device. For instance, the plant 100 can be configured so that an ambient air stream is compressed by compressor 103. The air compressed via the compressor 103 can be optionally chilled by at least one cooler 105 fluidly connected to the compressor 103 via at least one conduit (e.g. a direct contact aftercooler, mechanical chiller, other type of heat exchanger in which heat from the compressed gas is used to heat at least one other fluid passed through the heat exchanger to cool the compressed gas, etc.).

In some embodiments, the compressed fluid flow can then be fed to the adsorption system 107 via at least one conduit extending from the compressor 103 or cooler 105 for purification of the fluid via one or more on-stream adsorbers of the adsorption system 107.

As feed fluid stream (e.g. a feed air stream of air compressed via the compressor 103) passes through adsorbent beds of each on-stream adsorber of the adsorption system 107, undesired components of the fluid stream such as ambient moisture, $CO_2$, $N_2O$, hydrogen, carbon monoxide, heavy hydrocarbon components etc. can be completely or partially removed. The purified fluid can be output from the adsorption system 107 to be fed to at least one downstream system 110 via at least one adsorber output conduit connecting the adsorption system 107 to the downstream system 110 to process the purified fluid flow and generate one or more product flows.

One or more output fluid flows from the downstream system 110 and/or other device 111 of the plant (shown in broken line in FIG. 1) can be free of targeted components such as ambient moisture, $CO_2$, $N_2O$ and heavy hydrocarbons. These output fluid flows can be fed to a heater 112 via at least one conduit. The heater 112 can heat the output fluid from the downstream system 110 and/or other device 111 of the plant to a pre-selected regeneration fluid temperature or pre-selected regeneration fluid temperature range (e.g. heated to at least 150° C., heated to 150°-220° C., etc.) so a regeneration fluid can be fed to at least one off-stream adsorber of the adsorption system 107 to facilitate regeneration of the material within the beds of the adsorber while one or more on-stream adsorbers of the adsorption system 107 is in their on-stream state.

The heater 112 can be a heat exchange device (e.g. electric heater, steam heater, gas fired heater, etc.). The heater 112 can heat the one or more streams of fluid to create a heated regeneration fluid flow for feeding to the off-stream adsorber(s) of the adsorption system to regenerate the one or more layers of material within the vessel of the adsorber by desorbing the adsorbents captured within the material by thermal swing and/or pressure swing effects. The regeneration fluid having the desorbed material can be output from the adsorber 200 for treatment in a downstream waste removal system 115, which can utilize distillation columns, washing columns, or other treatment devices to treat the desorbed material. At least some of this output regeneration fluid can also (or alternatively) be merged with the input air stream flow for being recycled to the adsorption system 107 for treatment via one or more on-stream adsorbers of the adsorption system 107.

The removal of the adsorbates via the regeneration fluid can regenerate the adsorbent material layers of the bed as well as any adsorbent material layers of the bed (e.g. a layer of catalyst) so the adsorber 200 can operate at an improved efficiency when it is switched back to its on-stream state. After undergoing regeneration, the off-stream adsorber(s) can be switched back to an on-stream state. At the same time, the on-stream adsorber(s) can be switched to their off-stream state to undergo regeneration. The on-stream and off-stream adsorbers of the adsorption system that operate in parallel can be repetitively switched between their on-stream and off-stream states in this manner for a number of cycles.

The vessel 301 of each adsorber 200 can have one or more flow guiding structures (e.g. conduit structures or other type of flow guiding structures) defined and/or positioned within the chamber of the vessel 301 for guiding fluid within the chamber and through layers of material along a flow path. The one or more flow guiding structures can be configured so that the fluid passes from an outer region of the chamber to an inner region of the chamber to pass through the layers of material and/or pass from the inner region to the outer region to pass through the layers of material. In some embodiments, the flow path of the fluid can be defined so the fluid is passed back and forth from the inner and outer regions multiple times in a double stacked Z flow pattern.

For example, in some embodiments, the inner cavity of the vessel 301 can be arranged so that the fluid is passed in a "double Z stack flow" so that fluid passes between the inner and outer regions of the vessel through layers of material multiple times (e.g. (i) passes from an outer region to an inner region to pass through at least a first layer by passing in a first radial direction through that layer, then from the inner region to a downstream outer region and then from that downstream outer region to a further downstream inner region to pass through at least a second layer by passing in a second radial direction, (ii) passes from an inner region to an outer region to pass through at least one layer of material in a first radial direction, then from the outer region to a downstream inner region and then from that downstream inner region to a further downstream outer region to pass through at least one layer of material in a second radial direction, etc.)

The inner region of the vessel chamber or cavity can be considered a more centrally located region (e.g. a middle area of the vessel between the opposed heads of a vessel. The outer region of the vessel can be considered the region that is between an outer wall(s) of the vessel that defines its chamber and the inner region. The outer region can enclose or surround the inner region within the chamber of the vessel 301. Examples of such flow guiding structures within the vessel chamber (which can also be referred to as a vessel cavity) for fluid to pass between the inner and outer regions of the chamber for passing through the layers of material are discussed with more particularity herein with respect to FIGS. 2-9.

It should be appreciated that the adsorbers 200 can have a flow path that is defined therein for fluid that may pass through the vessel 301 of the adsorber. This flow path for the fluid when the fluid is passed through the adsorber when the adsorber is in the on-stream state can have a first flow orientation. The flow path of regeneration fluid that can pass through the vessel when the adsorber is in the off-stream state to undergo regeneration can have a second flow orientation that is the a reverse of the first orientation of the on-stream state flow path when the adsorber is in the off-stream state and undergoes regeneration. The inlet 202 for the on-stream flow path for when the adsorber is in the on-stream state may function as an outlet for the regeneration flow of fluid when the adsorber is in the off-stream state. The outlet 210 for the on-stream flow path for when the adsorber is in the off-stream state may function as an inlet for the regeneration flow of fluid when the adsorber is in the off-stream state.

Figure 6:
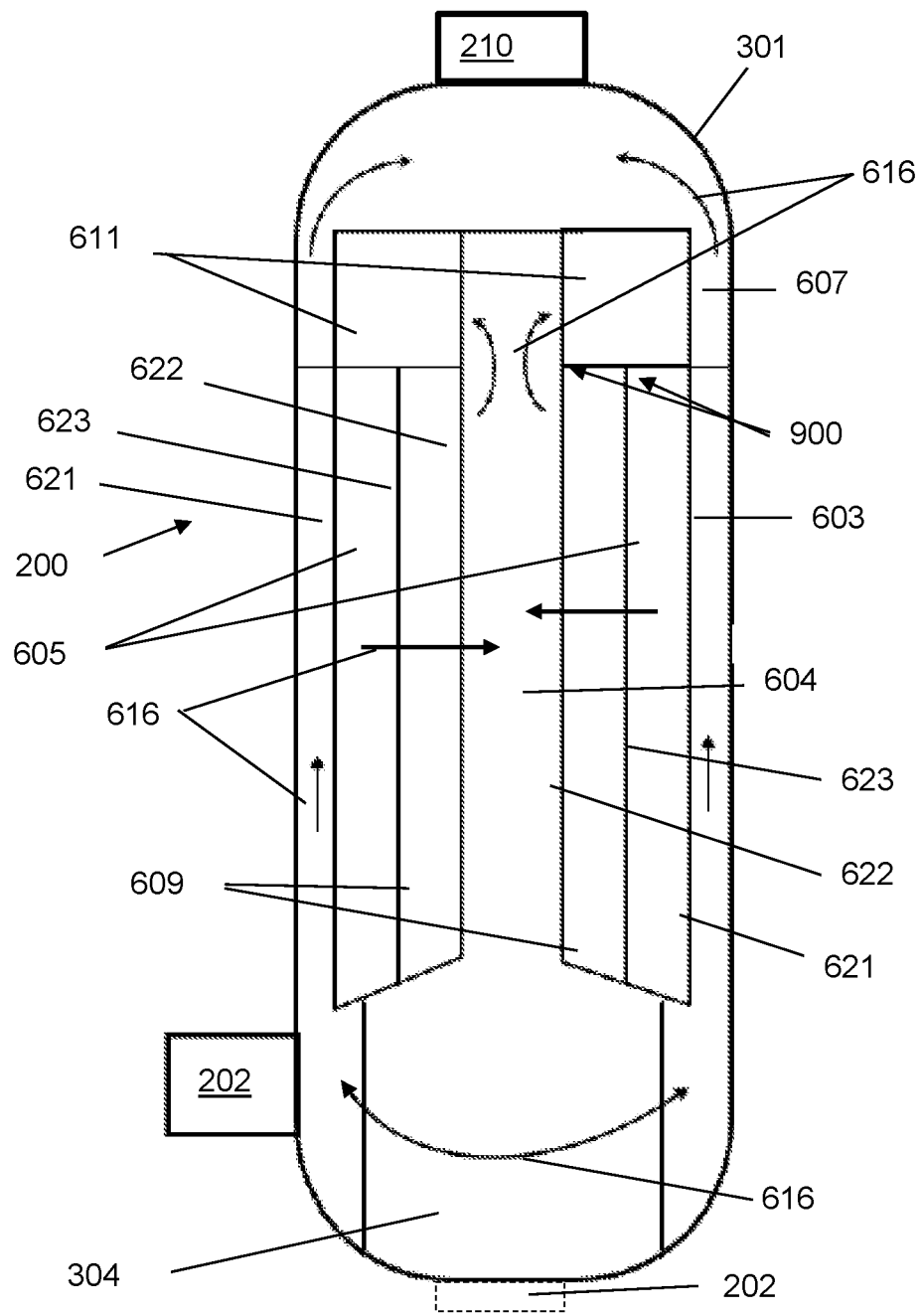
FIG. 6 is a schematic view of a fifth exemplary embodiment of a radial adsorber that can be included in the adsorption system 107 of the plaint 100.
Figure 7:
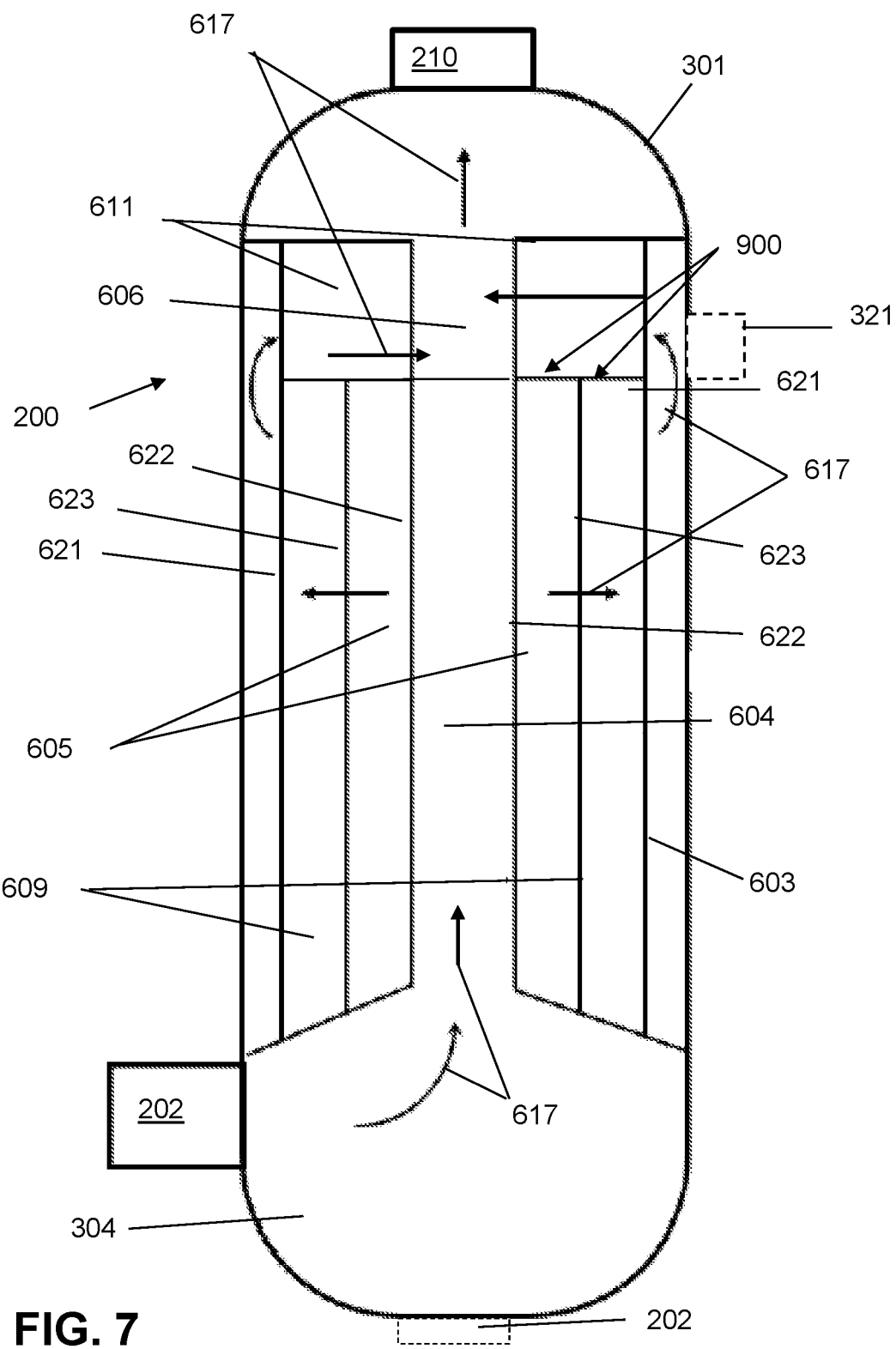
FIG. 7 is a schematic view of a sixth exemplary embodiment of a radial adsorber that can be included in the adsorption system 107 of the plaint 100.

In some embodiments, an adsorber 200 can have a vessel that is configured so that there is a Z flow with 2 or more stacked layers and each stacked layer has flow for fluid to move in only a radial direction or the flow path is substantially a flow of fluid that moves radially (e.g. 80-90% of the flow path of the fluid or more than 80% or more than 90% of the flow path moves radially). FIG. 2-7 illustrate exemplary embodiments of such vessel configurations for adsorbers 200. As may be appreciated from FIGS. 2-7, each stacked layer of material can have one or more concentric adsorbent sub-layers. FIGS. 2-5 illustrate examples of two stacked layers of material that each have one adsorbent sub-layer. FIGS. 6-7 illustrate exemplary embodiments that have two stacked layers, the first with two concentric adsorbent sub-layers and the second with one sub-layer.

Figure 8:
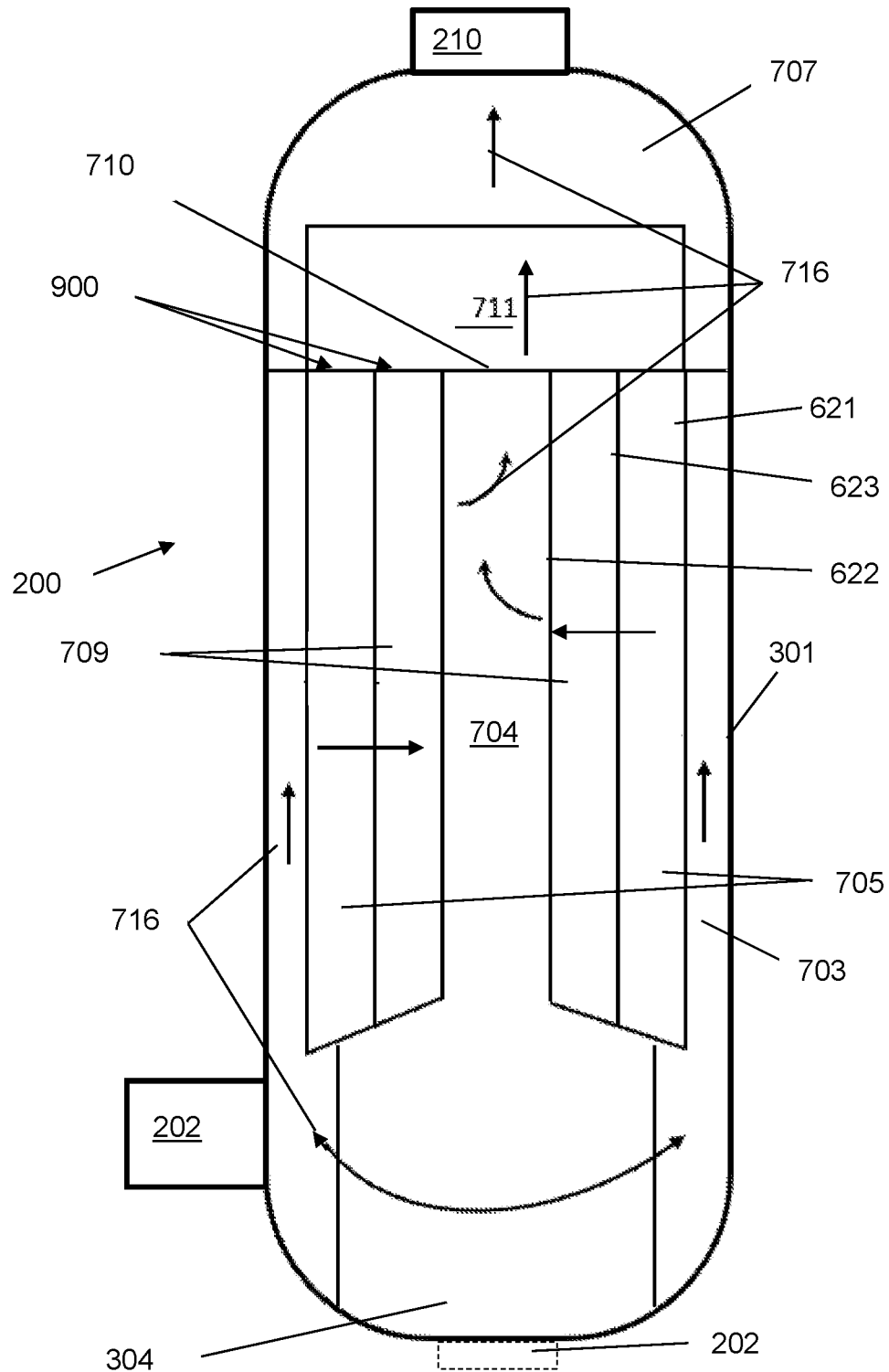
FIG. 8 is a schematic view of a seventh exemplary embodiment of a radial adsorber that can be included in the adsorption system 107 of the plaint 100.
Figure 9:
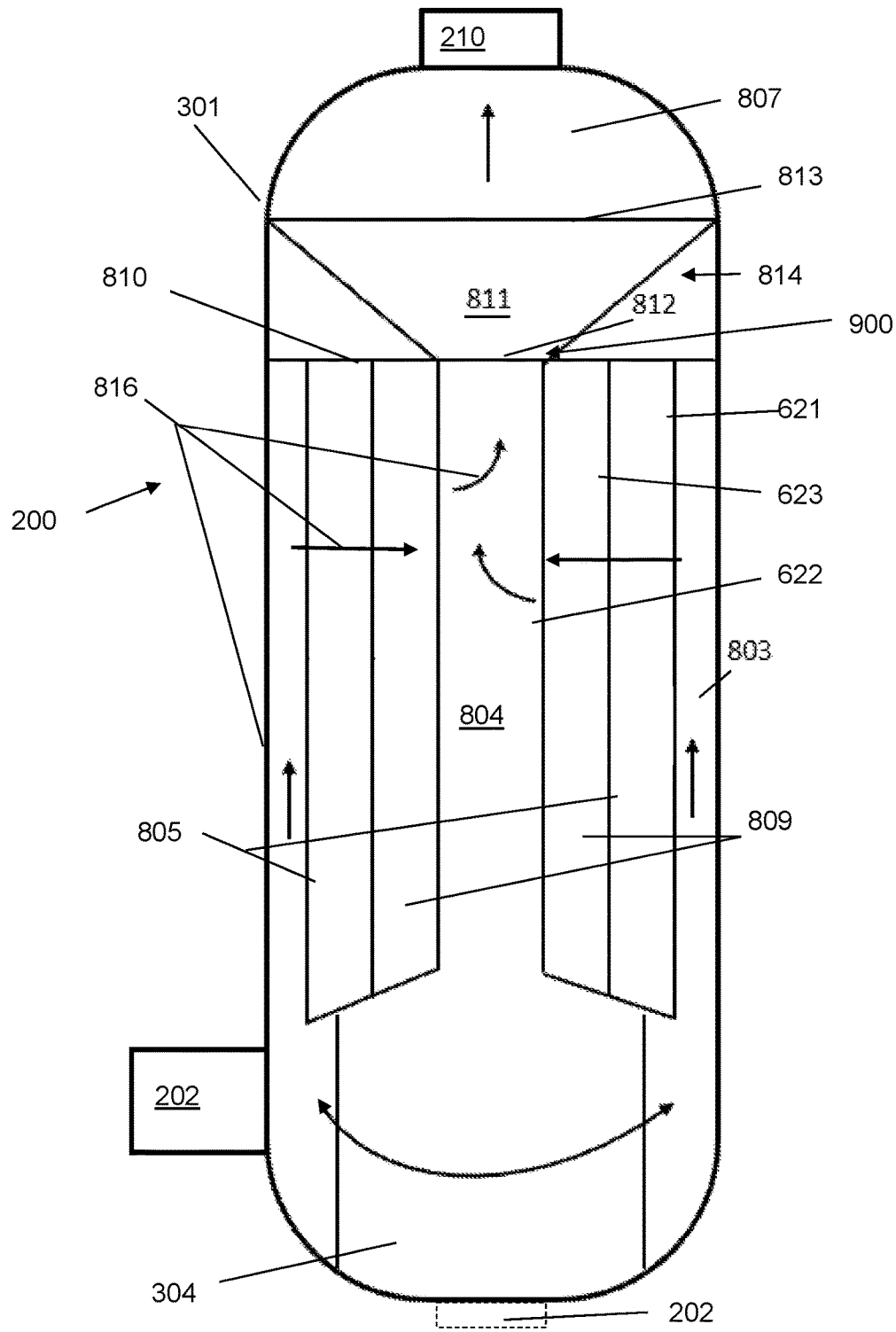
FIG. 9 is a schematic view of an eighth exemplary embodiment of a radial adsorber that can be included in the adsorption system 107 of the plaint 100.

Other embodiments of the adsorbers 200 can be configured so that there is a Z flow path of fluid with two or more stacked layers. FIGS. 8 and 9 illustrate examples of such an adsorber 200 configuration. At least one stacked layer can have flow in radial direction (e.g. a direction along a radius of the vessel) and at least one stacked layer can have flow in an axial direction (e.g. a vertical direction that is transverse or perpendicular to the radial flow direction). Each stacked layer could have additional sub-layers. FIGS. 8-9 show examples that utilize two stacked layers. The first has two sub-layers with a radial flow of fluid through those sub-layers. The second stacked layer has one sub-layer with a vertical flow of fluid passing through that sub-layer in an axial direction.

Referring to FIGS. 2-11, the radial adsorbers 200 of the adsorption system 107 can have different configurations. For example, the radial adsorber 200 can be structured for orientation vertically such that the length L between the opposite heads of the vessel of the adsorber 200 extends vertically and defines a height of the vessel and the width of the vessel is the extent to which the vessel extends horizontally (e.g. is defined by the diameter D of the vessel). In other embodiments, the vessel can be structured so that the vessel of the radial adsorber 200 is to be oriented horizontally so that its length extends horizontally and the height of the vessel can be defined by the vessel's diameter D.

The vessel of a radial adsorber 200 can include an inlet 202 that receives fluid to be purified via adsorption and an outlet 210. The inlet 202 can be positioned at a side of the vessel or at an inlet end of the vessel 301 at a head of the vessel 301 (shown in broken line). The outlet 210 can be at an end of the vessel or at a side of the vessel (shown in broken line in FIG. 2).

The vessel 301 of the radial adsorber 200 can also include an inner conduit structure 307 that is positioned internal to first and second outer annular conduit structures 303 and 308 within the chamber or cavity of the vessel. The inlet 202 can be in fluid communication with the first outer annular conduit structure 303 of the vessel and the outlet 210 can be in fluid communication with the second outer annular conduit structure 308. The vessel 301 can be structured so that fluid passes through the vessel along a defined flow path 306 for passing between inner and outer regions of the chamber of the vessel 301 for passing through the layers of material.

Figure 2:
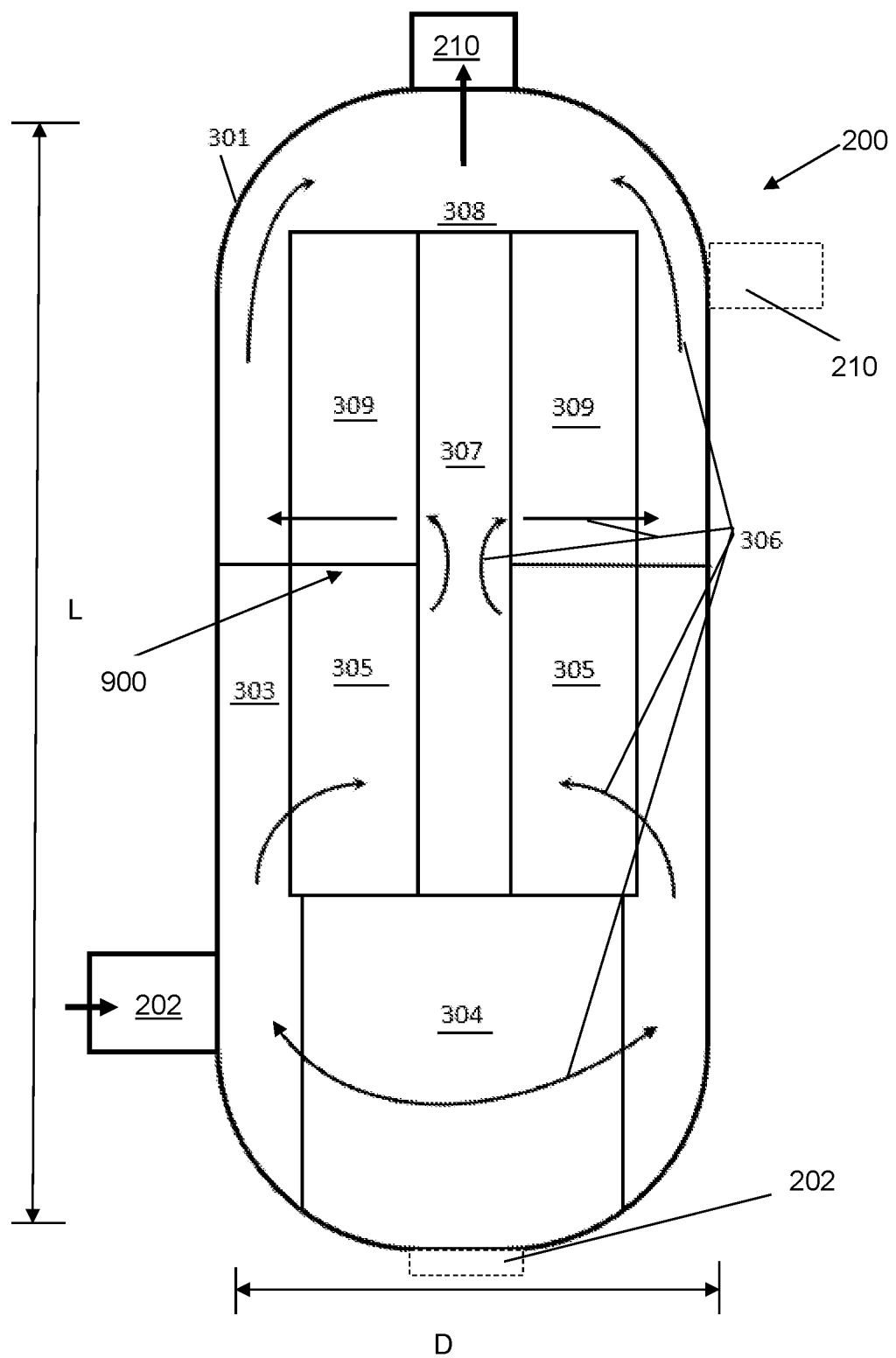
FIG. 2 is a schematic view of a first exemplary embodiment of a radial adsorber that can be included in the adsorption system 107 of the plaint 100.
Figure 3:
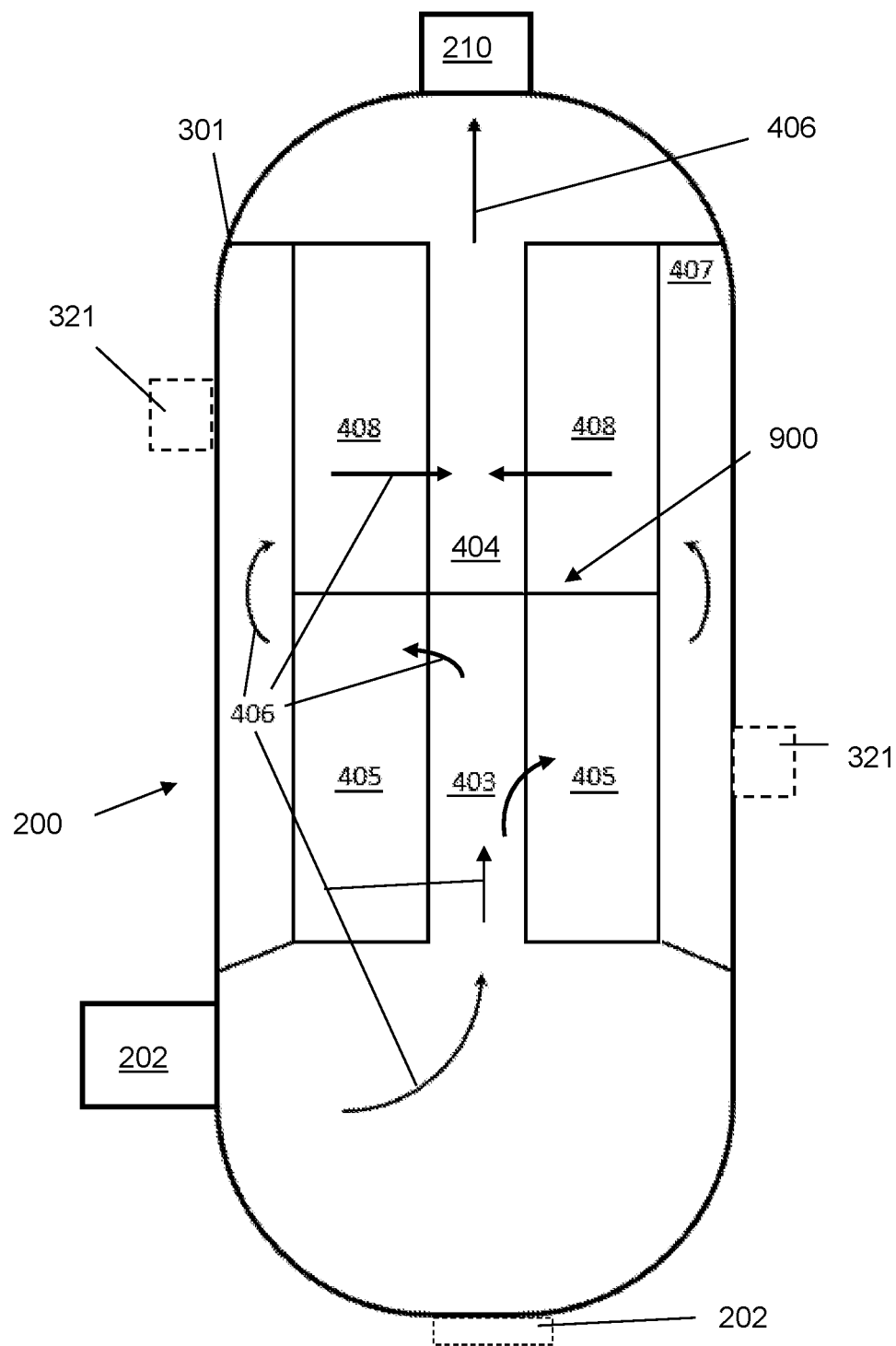
FIG. 3 is a schematic view of a second exemplary embodiment of a radial adsorber that can be included in the adsorption system 107 of the plaint 100.

Referring to the embodiments shown in FIGS. 2 and 3, these embodiments are examples of the radial adsorber 200 that can be configured to allow for complete removal of any intermediate screen element (e.g. a middle screen element) for a radial adsorber having a bed that includes two layers of material.

For the embodiment shown in FIG. 2, the flow path 306 that is defined within the vessel 301 of the adsorber 200 when operating in the on-stream state can include:
 (i) the fluid passing from the inlet 202 into the vessel 301 along a first flow segment of flow path 306,
 (ii) then through the first outer annular conduit structure 303 defining an initial fluid feed path for the fluid along a second flow segment of flow path 306,
 (iii) then through a first layer of material 305 along a third flow segment of flow path 306,
 (iv) then into the inner conduit structure 307 for being transported to a second layer of material 309 positioned downstream of the first layer 305 (e.g. above the first layer for vertical oriented vessels or positioned to a downstream side of the first layer downstream of the first layer for a horizontally oriented vessel) along a fourth flow segment of flow path 306,
 (v) then passed out of the second layer of material 309 to the second outer annular conduit structure 308 along a fifth flow segment of flow path 306, and
 (vi) then from the second outer annular conduit structure 308 the outlet 210 along a sixth flow segment of flow path 306 for outputting purified fluid from the vessel 301 after that fluid has been passed through and contacted the first and second layers 305 and 309 of material.

The vessel of the adsorber 200 can also include a flow distributor plate 304 that can be positioned in the vessel's chamber or cavity adjacent the inlet 202 to direct the fluid from the inlet 202 through the first outer annular conduit structure 303 toward the first layer of material 305. Other flow distribution elements can also be provided (e.g. positioned in the vessel 301, defined in the cavity of the vessel 301, etc.) to help direct the flow of fluid within the vessel 301 along the flow path 306.

The first outer annular conduit structure 303 can have at least one inlet opening to receive fluid from the inlet 202 and least one outlet opening adjacent an outer side of the first layer of material 305 for passing fluid from the first outer annular conduit structure 303 to the first layer of material 305.

The first inner annular conduit structure 307 can be a conduit having an internal channel that is in fluid communication with one or more openings adjacent the inner side of the first layer of material 305 for receiving fluid from that layer and one or more openings adjacent an inner side of the second layer of material 309 for outputting fluid into the second layer of material 309. Distal opposite ends of the first inner annular conduit structure can be closed to help drive the fluid within the inner channel of the first inner annular conduit structure 307 along the flow path 306.

The second outer annular conduit structure 308 can have at least one opening adjacent an outer side of the second layer of material 309 for receiving fluid from the second layer of material 309 for passing the fluid through the second outer annular conduit structure 308 to transport that fluid to the outlet 210. The second outer annular conduit structure 308 can have at least one opening in fluid communication with the outlet 210 through which purified fluid can pass for being output from the vessel 301.

It should be understood that the first inner annular conduit structure 307 and the first and second outer annular conduit structures 303 and 308 can each be structured as conduit-type structures within the vessel cavity that can each define a passageway for fluid to guide the fluid along a flow segment of a flow path within the cavity or chamber of the vessel. For example, the first outer annular conduits structure 303 can be defined to be an annular shape that extends between the inlet 202 and an outer side of the first layer of material 305 to guide fluid from the inlet to the first layer of material 305. The second outer annular conduit structure 308 can be an outer conduits positioned to guide fluid from an outer side of the second layer of material 309 to the outlet 210. The first inner annular conduit structure can be a first inner conduit that guides fluid from the inner side of the first layer of material 305 to the inner side of the second layer of material 309.

The first layer of material 305 can be positioned within a first receptacle of the vessel 301 and include first material that differs from the second material of the second layer of material 309 retained within a second receptacle of the vessel 301. When the absorber operates in the on-stream state, the first layer of material 305 can be considered an upstream layer UL and the second layer of material 309 can be considered a downstream layer DL. A flow bypass prevention mechanism 900 can be positioned between these layers.

Each layer of material can be retained in a receptacle having one or more holes for permitting fluid to be passed into and out of the receptacle. The one or more holes can be defined by one or more screen elements of the receptacles in some embodiments. Each of the receptacles that retain a layer of material can include one or more screens, mesh, at least one plate having multiple holes, or at least one perforated membrane of material having a particular pre-selected geometry for defining at least a portion of the receptacle. Each receptacle can also be another type of receptacle structure that can retain a layer of material in a desired location within the vessel 301 while also allowing fluid to pass into and out of the layer.

The material of the first and second layers 305 and 309 can be different types of material. For instance, the first layer and the second layer can each include a different component or combination of components from the following options: a molecular sieve, alumina, silica (e.g. silica gel), metal oxides, copper oxide-manganese oxide mixtures for carbon monoxide and hydrogen gas removal (CO/H2 removal), an adsorbent material or absorbent material (e.g. a catalyst) to remove nitrous oxide, an adsorbent material or absorbent material (e.g. a catalyst) to remove carbon monoxide, an adsorbent material or absorbent material (e.g. a catalyst) to remove carbon dioxide, an adsorbent material or absorbent material (e.g. a catalyst) to remove hydrogen, or an adsorbent material or absorbent material (e.g. a catalyst) to remove other target element or combination of target elements from a fluid (e.g. a gas having a mixture of gaseous compounds, air, etc.) passed through the layers.

When the adsorber 200 is in the off-stream state and may undergo regeneration, the flow path within the vessel 301 can be reversed. The regeneration fluid can pass into the vessel via outlet 210, which functions as a regeneration fluid inlet. The regeneration fluid can then pass through the tank along the reversed flow path and then exits the vessel 301 via the inlet 202, which functions as the regeneration fluid outlet.

Referring to FIG. 3, the vessel of the radial adsorber 200 can include a different internal configuration to define a different flow path 406 within the vessel 301. For instance, the vessel 301 can include first and second inner annular conduit structures 403 and 404 and a first outer annular conduit structure 407 that defines a fluid flow path 406 within the vessel 401. It should be understood that the first inner annular conduit structure 403, second inner annular conduit structure 404, and the first outer annular conduit structure 407 can each be structured as conduit-type structures within the vessel cavity that can each define a passageway for fluid to guide the fluid along a flow segment of a flow path within the cavity or chamber of the vessel 301. For example, the first and second inner annular conduits structures 403 and 404 can be inner conduits and the first outer annular conduit structure 407 can be an outer annular shaped conduit that is positioned to extend between outer sides of the first and second layers of material 405 and 408.

For example, the first inner annular conduit structure 403 can be a conduit having an internal channel that is in fluid communication with openings adjacent an inner side of a first layer of material 405 for conveying fluid received from the inlet 202 via at least one inlet in an upstream end of the structure to that first layer of material. A downstream end of the first annular conduit structure 403 can be closed to help drive fluid received from inlet 202 adjacent a first head of the vessel into the first layer of material 405, which can be positioned within a receptacle that has one or more holes so that the first layer of material 405 is in fluid communication with the first inner annular structure 403 and can receive fluid from the first inner annular structure 403. The receptacle of the first layer of material can be positioned to enclose at least a portion of the first inner annular structure 403.

A downstream end of the first inner annular conduit structure can be closed to help drive the fluid within the inner channel of the first inner annular conduit structure 403 along the flow path 406 within the vessel for directing the fluid into the first layer of material 405. There may be one or more openings in the first annular conduit structure in communication with its inner channel that are adjacent the inner side of the first layer of material 405 so the fluid can pass out of the first inner annular structure 403 and into the first layer of material 405.

A first outer annular conduit structure 407 can have at least one inlet opening adjacent an outer side of the first layer of material 405 to receive fluid from that layer via one or more holes in the receptacle of the vessel 401 that retains the first layer of material 405. The one or more holes of the first receptacle retaining the first layer of material 405 at its outer side and the one or more holes at its inner side can be perforations, tortious passageways defined in mesh of a screen, or other types of holes.

The first outer annular conduit structure 407 can also define a passageway in communication with the one or more inlet openings to guide or transport the fluid to at least one outlet opening adjacent an outer side of the second layer of material 408 retained within a second receptacle of the vessel 301. The second receptacle can have at least one hole at its outer side and at least one hole at its inner side to provide a fluidly communicative connection between the first annular outer structure 407 and the second inner annular structure 404. The one or more holes of the second receptacle at its outer side and one or more holes at its inner side can be perforations, tortious passageways defined in mesh of a screen, or other types of holes.

The first and second receptacles that retain the first and second layers of material 405 and 408 can each be defined by or include one or more screens, mesh, at least one plate having multiple holes, at least one perforated membrane of material, or other type of receptacle structure that can retain a layer of material in a desired location within the vessel 301 while also allowing fluid to pass into and out of the layer.

It should be appreciated that when the vessel 301 is in its on-stream state, the first layer of material 405 can be considered an upstream layer of material UL and the second layer of material 408 can be considered a downstream layer of material DL. A flow bypass prevention mechanism 900 can be positioned between these layers.

A second inner annular conduit structure 404 can include an inner passageway that is in fluid communication with at least one inlet opening adjacent the inner side of the second layer of material 408 to receive fluid from the second layer of material and pass that fluid toward the outlet 210. An outlet end of the second inner annular conduit structure can be in fluid communication with the outlet 210 so that purified fluid is passable out of the vessel 301 after the fluid was passed through the first and second layers of material 405 and 408.

There can be a flow path 406 of the vessel 301 that is configured for passing fluid between inner and outer regions of the chamber of the vessel 301 for passing through the layers of material. It should be appreciated that the flow path 406 of the vessel 301 in the on-stream state can include:

(i) the fluid passing from the inlet 202 into the vessel 301 along a first flow segment of flow path 406, (ii) then through the first inner annular conduit structure 403 defining an initial fluid feed path for the fluid along a second flow segment of flow path 406, (iii) then through a first layer of material 405 along a third flow segment of flow path 406, (iv) then into the first outer conduit structure 407 for being transported to a second layer of material 408 positioned downstream of the first layer 405 (e.g. above the first layer for vertical oriented vessels or positioned to a downstream side of the first layer downstream of the first layer for a horizontally oriented vessel) along a fourth flow segment of flow path 406, (v) then passed out of the second layer of material 408 to the second inner annular conduit structure 404 along a fifth flow segment of flow path 406, and (vi) then from the second inner annular structure 404 to the outlet 210 along a sixth flow segment of flow path 406 for outputting purified fluid from the vessel 301 after that fluid has been passed through and contacted the first and second layers 405 and 408 of material.

In embodiments of the radial adsorber 200, including the embodiments discussed herein and shown in the drawings, the first material of the first layer (e.g. first layers 305 or 405, etc.) can be silica gel and/or alumina particulate material configured to remove moisture from the fluid (e.g. via composition and pore structure of the particulate material to facilitate removal of water from the fluid via adsorption) and the second material of the second layer (e.g. second layers 309, 408, etc.) can be 13X zeolite particulates configured to remove $CO_2$ from the fluid (e.g. via composition and pore structure of the particulate material to facilitate removal of $CO_2$ via adsorption).

The first layer of material in the embodiments of the radial adsorber 200 can also include particulates that have a different average particle size than the average particle size of the second layer of material. In other embodiments, it is contemplated that the first and second layers of material can have the same average particle size or similar average particle sizes.

Embodiments of the radial adsorber 200 can also be configured to include more than two layers of material. FIGS. 4-9 illustrate examples of radial adsorber vessels 301 that can be structured for more than two layers of material. Referring to the embodiments shown in FIGS. 4 and 5, these embodiments are examples of the radial adsorber 200 that can be configured to allow for complete removal of any intermediate screen element (e.g. a middle screen element) for a radial adsorber having a bed that includes three layers of material. Referring to the embodiments of FIGS. 7, 8 and 9, these embodiments are examples of radial adsorbers 200 that can utilize a reduced number of middle screen elements for adsorbers that have beds that use three or more material layers.

Figure 4:
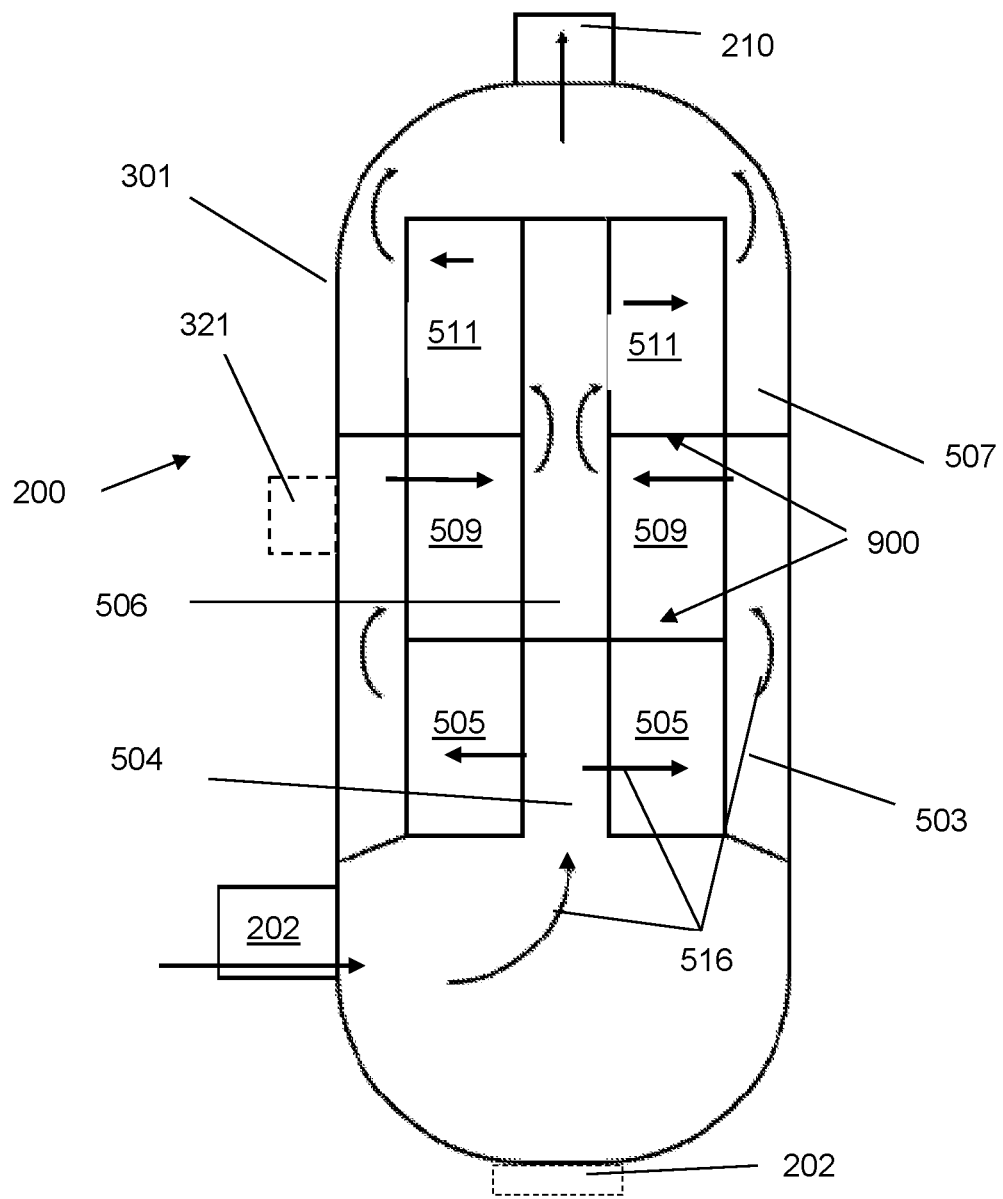
FIG. 4 is a schematic view of a third exemplary embodiment of a radial adsorber that can be included in the adsorption system 107 of the plaint 100.

The radial adsorber 200 of FIG. 4 includes a vessel 301 that includes first, second, and third layers of material 505, 509, and 511. A first inner conduit 504 can be positioned to receive fluid from an inlet 202 of the vessel 301 to pass that fluid to the first layer of material 505. The first inner conduit can include an inlet for receiving fluid from the inlet 202 and at least one outlet opening adjacent an inner side of the first layer of material 505. The first layer of material 505 can be retained in a first receptacle of the vessel that includes one or more openings adjacent at least one outlet of the first inner conduit 504 and one or more openings at its outer side adjacent a first outer annular conduit 503 so that fluid can be passed from the first layer 505 to at least one inlet opening of the first outer conduit 503.

The first outer conduit 503 can define a passageway through which the fluid is passable from the first layer of material 505 to the second layer of material 509. At least one outlet opening of the first outer conduit can be adjacent an outer side of the second layer of material 509 so that fluid is passable into the second layer. The second layer can be retained in a second retainer of the vessel 301 that has at least one opening at its outer side and at least one opening at its inner side to fluidly connect the first outer conduit to a second inner conduit 506 so that fluid is passable through the second layer of material 509 and into the second inner conduit 506.

The second inner conduit 506 can include at least one inlet opening adjacent the inner side of the second layer of material so that fluid is passable into the second inner conduit. The second inner conduit 506 can also include at least one outlet opening adjacent the inner side of a third layer of material 511 so that the fluid can be guided through the second inner conduit and passed into the third layer of material 511. The third layer of material 511 can be retained within a third receptacle of the vessel that has at least one opening at its inner side and at least one opening at its outer side so that fluid is passable through the third layer of material to a second outer conduit 507.

The first, second, and third receptacles that retain the first, second, and third layers of material 505, 509, and 511 can each include screens, mesh, plates having multiple holes, a perforated membrane of material, or be structured as some other type of receptacle structure that can retain a layer of material in a desired location within the vessel 301 while also allowing fluid to pass into and out of the layer.

The second outer conduit 507 can receive fluid via at least one inlet opening of the second outer conduit 507 that is adjacent the outer side of the third layer of material 511. An outlet end of the second outer conduit 507 can be in fluid communication with outlet 210 of the vessel for conveying the purified fluid out of the vessel after the fluid has passed through the first, second, and third layers 505, 509, and 511.

It should be understood that the first inner conduit 504, the second inner conduit 506, the first outer conduit 503 and the second outer conduit 507 can each be structured as conduit-type structures within the vessel cavity or vessel chamber that can each define a passageways for guiding the fluid within the cavity of the vessel along a flow segment of a flow path.

There can be a flow path 516 of the vessel 301 that is configured for passing fluid between inner and outer regions of the chamber of the vessel 301 for passing through the layers of material. It should be appreciated that the flow path 516 of the vessel 301 in the on-stream state can include:

(i) the fluid passing from the inlet 202 into the vessel 301 along a first flow segment of flow path 516, (ii) then through the first inner conduit 504 defining an initial fluid feed path for the fluid along a second flow segment of flow path 516, (iii) then through a first layer of material 505 along a third flow segment of flow path 516,
(iv) then into the first outer conduit 503 for being transported to a second layer of material 509 positioned downstream of the first layer 505 (e.g. above the first layer for vertical oriented vessels or positioned to a downstream side of the first layer downstream of the first layer 505 for a horizontally oriented vessel) along a fourth flow segment of flow path 516,
(v) then passed out of the second layer of material 509 to the second inner conduit 506 along a fifth flow segment of flow path 516,
(vi) then from the second inner conduit 506 to the third layer of material 511 positioned downstream of the second layer 509 (e.g. above the second layer for vertical oriented vessels or positioned to a downstream side of the second layer downstream of the second layer for a horizontally oriented vessel) along a sixth flow segment of the flow path 516,
(vii) then passed out of the third layer of material 511 to a second outer conduit 507 along a seventh flow segment of the flow path 516, and
(viii) then passed from the second outer conduit 507 to the outlet 210 of the vessel 301 along an eighth flow segment of flow path 516 for outputting purified fluid from the vessel 301 after that fluid has been passed through and contacted the first, second, and third layers of material 505, 509, and 511.

It should be appreciated that when the vessel 301 is in its on-stream state, the first layer of material 505 can be considered an upstream layer of material UL and the second layer of material 509 can be considered a downstream layer of material DL relative to the first layer of material 505. A first flow bypass prevention mechanism 900 can be positioned between these layers. A second flow bypass prevention mechanism 900 can also be positioned between the third layer of material 511 and the second layer of material 509. The second layer of material can be considered the downstream layer of material DL and the third layer of material 511 can be considered the upstream layer of material UL for that flow bypass prevention mechanism.

An example of the material for the different layers can include the first layer of material 505 including alumina and/or silica gel for removal of moisture from the fluid, the second layer of material 509 include 13X zeolite for removal of CO2 from the fluid, and the third layer of material 511 including calcium X type zeolite for removal of N2O from the fluid. Other examples of material for the different layers include different types of materials suitable for removal of different target elements or removal of different combinations of target elements.

It should be appreciated that the first, second and third layers of materials can include other combinations of material. For instance, in other embodiments, the first layer of the material 505 can include silica, alumina, molecular sieve such 13X and the second layer of material 509 can include molecular sieve such as 13X and CaX, and the third layer of material 511 can include molecular sieve, such as 13X and CaX, metal oxides, or copper oxide-manganese oxide mixtures for carbon monoxide and hydrogen gas removal (CO/H2 removal).

Figure 5:
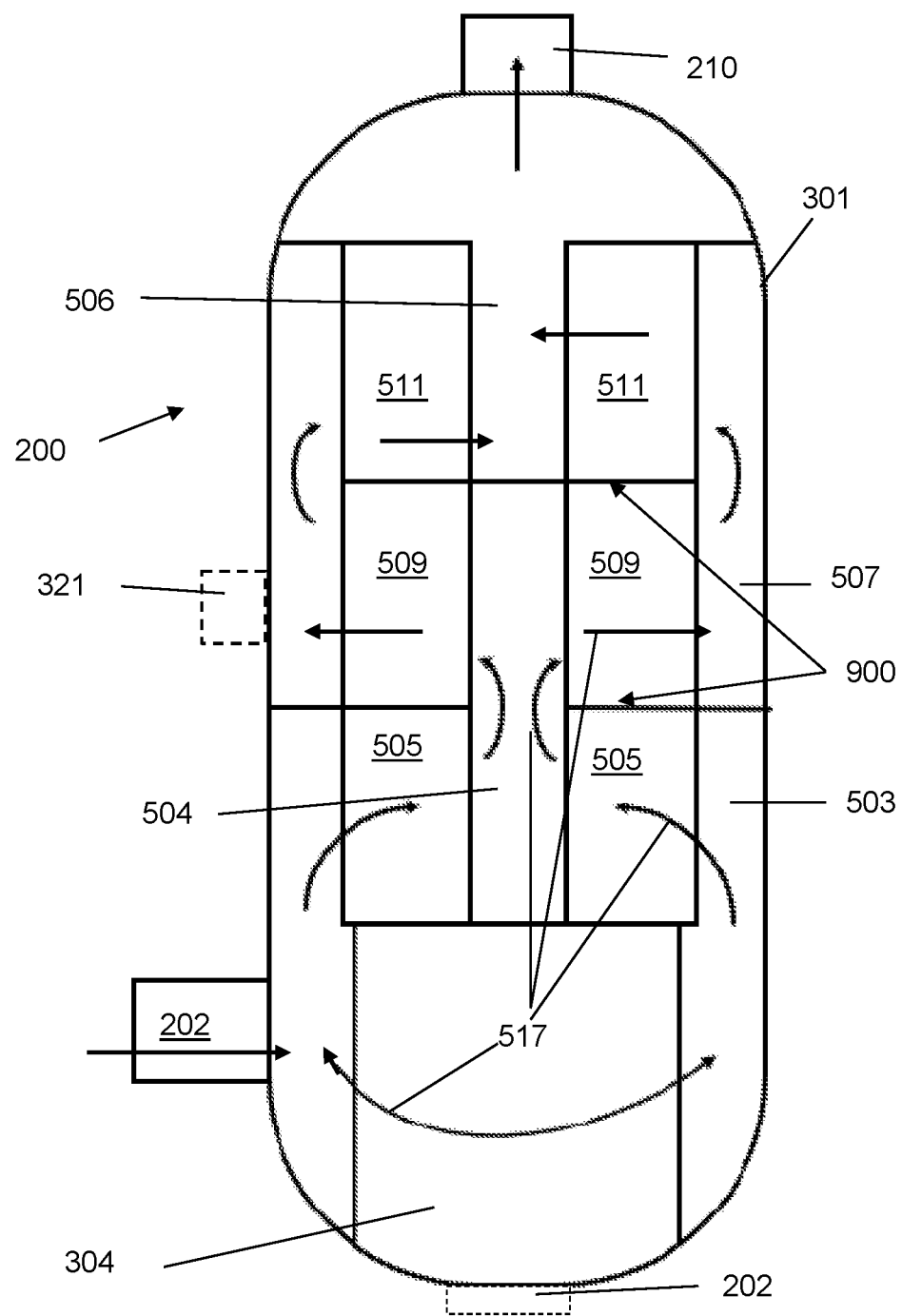
FIG. 5 is a schematic view of a fourth exemplary embodiment of a radial adsorber that can be included in the adsorption system 107 of the plaint 100.

The radial adsorber 200 of FIG. 5 includes a vessel 301 that includes first, second, and third layers of material 505, 509, and 511. A first outer conduit 503 can be positioned to receive fluid from an inlet 202 of the vessel 301 to pass that fluid to the first layer of material 505. A flow distributor plate 304 can be positioned to divert fluid passed into the vessel 301 via inlet 202 to facilitate a flow of fluid along opposite outer sides of the cavity of the vessel along the first outer conduit 503 along a desired flow path 517. The first outer conduit 503 can include an inlet for receiving fluid from the inlet 202 and at least one outlet opening adjacent an outer side of the first layer of material 505. The first layer of material 505 can be retained in a first receptacle of the vessel that includes one or more openings adjacent at least one outlet of the first outer conduit 503 and one or more openings at its inner side adjacent a first inner conduit 504 so that fluid can be passed from the first layer 505 to at least one inlet opening of the first inner conduit 504. The first inner conduit 504 can be an annular space, an annular conduit, a channel, or a pipe-type structure, tubing or be a defined passageway within the vessel for some embodiments.

The first inner conduit 504 can define a passageway through which the fluid is passable from the first layer of material 505 to the second layer of material 509. At least one outlet opening of the first inner conduit 504 can be adjacent an inner side of the second layer of material 509 so that fluid is passable into the second layer. The second layer 509 can be retained in a second retainer of the vessel 301 that has at least one opening at its outer side and at least one opening at its inner side to fluidly connect the first inner conduit 504 to a second outer conduit 507 so that fluid is passable through the second layer of material 509 and into the second inner conduit 506.

The second outer conduit 507 can include at least one inlet opening adjacent the outer side of the second layer of material 509 so that fluid is passable into the second outer conduit 507. The second outer conduit 507 can also include at least one outlet opening adjacent the outer side of a third layer of material 511 so that the fluid can be guided through the second outer conduit 507 and passed into the third layer of material 511. The third layer of material 511 can be retained within a third receptacle of the vessel that has at least one opening at its inner side and at least one opening at its outer side so that fluid is passable through the third layer of material 511 to a second inner conduit 506.

The first, second, and third receptacles that retain the first, second, and third layers of material 505, 509, and 511 can each include screens, mesh, plates having multiple holes, a perforated membrane of material, or be structured as some other type of receptacle structure that can retain a layer of material in a desired location within the vessel 301 while also allowing fluid to pass into and out of the layer.

The second inner conduit 506 can receive fluid via at least one inlet opening of the second inlet conduit 506 that is adjacent the inner side of the third layer of material 511 so fluid passing from the at least one opening of the inner side of the receptacle of the third layer of material can be received into the second inner conduit 506. An outlet end of the second inner conduit 506 can be in fluid communication with outlet 210 of the vessel for conveying the purified fluid out of the vessel after the fluid has passed through the first, second, and third layers 505, 509, and 511.

There can be a flow path 517 of the vessel 301 that is configured for passing fluid between inner and outer regions of the chamber of the vessel 301 for passing through the layers of material. It should be appreciated that the flow path 517 of the vessel 301 when operating in the on-stream state can include:
(i) the fluid passing from the inlet 202 into the vessel 301 along a first flow segment of flow path 517, (ii) then through the first outer conduit 503 defining an initial fluid feed path for the fluid along a second flow segment of flow path 517,
(iii) then through a first layer of material 505 along a third flow segment of flow path 517,
(iv) then into the first inner conduit 504 for being transported to a second layer of material 509 positioned downstream of the first layer 505 (e.g. above the first layer for vertical oriented vessels or positioned to a downstream side of the first layer downstream of the first layer 505 or a horizontally oriented vessel) along a fourth flow segment of flow path 517,
(v) then passed out of the second layer of material 509 to the second outer conduit 507 along a fifth flow segment of flow path 517,
(vi) then from the second outer conduit 507 to the third layer of material 511 positioned downstream of the second layer 509 (e.g. above the second layer for vertical oriented vessels or positioned to a downstream side of the second layer downstream of the second layer for a horizontally oriented vessel) along a sixth flow segment of the flow path 517,
(vii) then passed out of the third layer of material 511 to a second inner conduit 506 along a seventh flow segment of the flow path 517, and
(viii) then passed from the second inner conduit 506 to the outlet 210 of the vessel 301 along an eighth flow segment of flow path 517 for outputting purified fluid from the vessel 301 after that fluid has been passed through and contacted the first, second, and third layers of material 505, 509, and 511.

It should be appreciated that when the vessel 301 is in its on-stream state, the first layer of material 505 can be considered an upstream layer of material UL and the second layer of material 509 can be considered a downstream layer of material DL relative to the first layer of material 505. A first flow bypass prevention mechanism 900 can be positioned between these layers. A second flow bypass prevention mechanism 900 can also be positioned between the third layer of material 511 and the second layer of material 509. The second layer of material can be considered the downstream layer of material DL and the third layer of material 511 can be considered the upstream layer of material UL for that flow bypass prevention mechanism.

An example of the material for the different layers for the embodiment of FIG. 5 can include the first layer of material 505 including alumina and/or silica gel for removal of moisture from the fluid, the second layer of material 509 include 13X zeolite for removal of CO2 from the fluid, and the third layer of material 511 including calcium X type zeolite for removal of N2O from the fluid. Other examples of material for the different layers include different types of materials suitable for removal of different target elements or removal of different combinations of target elements.

It should be appreciated that the first, second and third layers of materials can include other combinations of material. For instance, in other embodiments, the first layer of the material 505 can include silica, alumina, molecular sieve such 13X and the second layer of material 509 can include molecular sieve such as 13X and CaX, and the third layer of material 511 can include molecular sieve, such as 13X and CaX, metal oxides, or copper oxide-manganese oxide mixtures for carbon monoxide and hydrogen gas removal (CO/H2 removal).

Referring to the embodiment of FIG. 6, the vessel 301 can include an inner cavity that has a flow distributor plate 304 to divert fluid received via inlet 202 so that the fluid is passed along a flow path 616. The fluid can first be diverted via the flow distributor plate 304 so that fluid from the inlet 202 is passed into an inlet of a first outer annular conduit 603 that has at least one outlet opening adjacent an outer side of a first layer of material 605 retained within a first receptacle that has at least one hole at its inner side and at least one hole at its outer side so fluid is passable from the outlet of the first outer annular conduit 603, through the first layer of material 605, and into the second layer of material 609. The second layer of material 609 can be retained within a second receptacle that is positioned inwardly of the first layer of material within the vessel 301. The second receptacle can have at least one hole at its outer side adjacent the inner side of the first layer of material 605 and also have at least one hole at its inner side adjacent a first inner conduit 604 so that fluid is passable from the first layer 605, through the second layer 609, and into the first inner conduit 604 via at least one inlet opening of the first inner conduit adjacent the inner side of the second layer of material 609.

The first inner conduit 604 can be positioned to guide fluid from the second layer 609 to an inner side of a third layer of material 611 retained within a third receptacle of the vessel that has at least one hole at its inner side to receive fluid from at least one outlet of the first inner conduit adjacent the inner side of the third layer of material. The third receptacle that retains the third layer of material 611 can also have at least one hole at its outer side adjacent an inlet of a second outer conduit 607 so that fluid is passable through the third layer of material 611 along the flow path 616 and then passable into the second outer conduit 607 via an inlet of the second outer conduit 607 adjacent the outer side of the third layer of material. The second outer conduit 607 can be in fluid communication with the outlet 210 of the vessel so that the fluid can be output from the vessel 301 after the fluid has been passed through the first, second, and third layers of materials 605, 609, and 611 to be purified.

It should be understood that the first inner conduit 604, the first outer conduit 603 and the second outer conduit 607 can each be structured as conduit-type structures within the vessel cavity or vessel chamber that can each define a passageway for guiding the fluid within the cavity of the vessel along flow segments of a flow path.

There can be a flow path 616 of the vessel 301 that is configured for passing fluid between inner and outer regions of the chamber of the vessel 301 for passing through the layers of material. The vessel 301 can be configured so that flow path 616 is defined so that the flow path 616 includes the following flow segments when operating in the on-stream state:
(i) the fluid passing from the inlet 202 into the vessel 301 along a first flow segment of flow path 616,
(ii) then through the first outer conduit 603 defining an initial fluid feed path for the fluid along a second flow segment of flow path 616,
(iii) then through a first layer of material 605 along a third flow segment of flow path 616,
(iv) then through a second layer of material 609 adjacent the first layer 605 that is positioned inward of the first layer 605 and is located closer to a center of the vessel as compared to the first layer 605 along a fourth flow segment of flow path 616,
(v) then passed out of the second layer of material 609 to the first inner conduit 604 along a fifth flow segment of flow path 616,
(vi) then from the first inner conduit 604 to the third layer of material 611 positioned downstream of the second layer 609 (e.g. above the second layer for vertical oriented vessels or positioned to a downstream side of the second layer downstream of the second layer for a horizontally oriented vessel) along a sixth flow segment of the flow path 616, (vii) then passed out of the third layer of material 611 to a second outer conduit 607 along a seventh flow segment of the flow path 616, and (viii) then passed from the second outer conduit 607 to the outlet 210 of the vessel 301 along an eighth flow segment of flow path 616 for outputting purified fluid from the vessel 301 after that fluid has been passed through and contacted the first, second, and third layers of material 605, 609, and 611.

The first, second, and third receptacles that retain the first, second, and third layers of material 605, 609, and 611 can each include one or more screens, mesh, one or more plates having multiple holes, at least one perforated membrane of material, or be structured as some other type of receptacle structure that can retain a layer of material in a desired location within the vessel 301 while also allowing fluid to pass into and out of the layer.

For instance, the first and second receptacles that retain the first and second layers 605 and 609 can be defined within the cavity of the vessel via an assembly of screens. There can be a first outer screen 621, a second inner screen 622 and a third intermediate screen 623 between the first outer screen 621 and the second inner screen 622. In some embodiments, these screens can define annular shaped structures for facilitating retention of material to define at least two of the material layers. We have found that this arrangement of screens can allow for a reduced number of intermediate screens as compared to conventional radial adsorbers that utilize three layers of material while still providing a sufficient size of each layer for adequate purification of the fluid via removal of at least one target element from the fluid.

It should be appreciated that when the vessel 301 is in its on-stream state, the first layer of material 605 can be considered an upstream layer of material UL and the third layer of material 611 can be considered a downstream layer of material DL relative to the first layer of material 605. A first flow bypass prevention mechanism 900 can be positioned between these layers. A second flow bypass prevention mechanism 900 can also be positioned between the third layer of material 611 and the second layer of material 609. The second layer of material can be considered the downstream layer of material DL and the third layer of material 611 can be considered the upstream layer of material UL for the second flow bypass prevention mechanism.

In other embodiments, a flow bypass prevention mechanism 900 can be positioned so it has a first side that extends between the first layer of material 605 and the third layer of material 611 and a second side that extends between the second layer of material 609 and the third layer of material 611.

The first, second, and third layers of material 605, 609, and 611 can include different material. These layers can include silica gel and/or alumina for one of the layers, a calcium X type zeolite for one of the layers, and the 13X zeolite for another one of the layers. Other examples of material for the different layers include different types of materials suitable for removal of different target elements or removal of different combinations of target elements. For instance one of the layers can include metal oxide material to remove hydrogen (H2) and carbon monoxide (CO) from the fluid as yet another suitable option for material that can be used in any of the first, second, and third layers 605, 609, and 611.

Referring to the embodiment shown in FIG. 7, the vessel 301 can include an inner cavity that has an inner cavity configuration so that fluid received via inlet 202 is passed along a flow path 617. The fluid can pass from the inlet 202 to an inlet of a first inner conduit 604 that has at least one outlet opening adjacent in fluid communication with the vessel inlet 202 and at least one outlet in fluid communication with an inner side of a first layer of material 605 retained within a first receptacle that has at least one hole at its inner side and at least one hole at its outer side so fluid is passable from the outlet of the first inner conduit 604, through the first layer of material 605, and into the second layer of material 609. The second layer of material 609 can be retained within a second receptacle that is positioned outwardly of the first layer of material within the vessel 301. The second receptacle can have at least one hole at its inner side adjacent the outer side of the first layer of material 605 and also have at least one hole at its outer side adjacent a first inner conduit 604 so that fluid is passable from the first layer 605, through the second layer 609, and into the first outer conduit 603 via at least one inlet opening of the first outer conduit 604 adjacent the outer side of the second layer of material 609.

The first outer conduit 603 can be positioned to guide fluid from the second layer 609 to an outer side of a third layer of material 611 retained within a third receptacle of the vessel that has at least one hole at its outer side to receive fluid from at least one outlet of the first outer conduit 603 adjacent the outer side of the third layer of material 611. The third receptacle that retains the third layer of material 611 can also have at least one hole at its inner side adjacent an inlet of a second inner conduit or the inner side of a downstream outlet of the second inner conduit 606 so that fluid is passable through the third layer of material 611 along the flow path 617 and then passable into the second inner conduit 606. The second inner conduit 606 can be in fluid communication with the outlet 210 of the vessel so that the fluid can be output from the vessel 301 after the fluid has been passed through the first, second, and third layers of materials 605, 609, and 611 to be purified.

It should be understood that the first inner conduit 604, the second inner conduit 606, and the first outer conduit 603 can each be structured as conduit-type structures within the vessel cavity or vessel chamber that can each define a passageway for guiding fluid within the cavity or chamber of the vessel along a flow segment of a flow path.

There can be a flow path 617 of the vessel 301 that is configured for passing fluid between inner and outer regions of the chamber of the vessel 301 for passing through the layers of material. The vessel 301 can be configured so that flow path 617 is defined so that the flow path 617 includes the following flow segments when operating in the on-stream state:

(i) the fluid passing from the inlet 202 into the vessel 301 along a first flow segment of flow path 617, (ii) then through the first inner conduit 604 defining an initial fluid feed path for the fluid along a second flow segment of flow path 617, (iii) then through a first layer of material 605 along a third flow segment of flow path 617, (iv) then through a second layer of material 609 adjacent the first layer 605 that is positioned outward of the first layer 605 and is located farther from a center of the vessel as compared to the first layer 605 along a fourth flow segment of flow path 617, (v) then passed out of the second layer of material 609 to the first outer conduit 603 along a fifth flow segment of flow path 617, (vi) then from the first outer conduit 603 to the third layer of material 611 positioned downstream of the second layer 609 (e.g. above the second layer for vertical oriented vessels or positioned to a downstream side of the second layer downstream of the second layer for a horizontally oriented vessel) along a sixth flow segment of the flow path 617, (vii) then passed out of the third layer of material 611 to a second inner conduit 606 or a downstream portion of the first inner conduit 604 along a seventh flow segment of the flow path 617, and (viii) then passed from the second inner conduit 606 or downstream portion of the first inner conduit 604 to the outlet 210 of the vessel 301 along an eighth flow segment of flow path 617 for outputting purified fluid from the vessel 301 after that fluid has been passed through and contacted the first, second, and third layers of material 605, 609, and 611.

The first, second, and third receptacles that retain the first, second, and third layers of material 605, 609, and 611 can each include one or more screens, mesh, one or more plates having multiple holes, at least one perforated membrane of material, or be structured as some other type of receptacle structure that can retain a layer of material in a desired location within the vessel 301 while also allowing fluid to pass into and out of the layer.

For example, the first and second receptacles that retain the first and second layers 605 and 609 can be defined within the cavity of the vessel via an assembly of screens. There can be a first outer screen 621, a second inner screen 622 and a third intermediate screen 623 between the first outer screen 621 and the second inner screen 622. In some embodiments, these screens can help define annular shaped structures for facilitating retention of material to define multiple material layers. This arrangement can allow for a reduced number of middle screens as compared to conventional radial adsorbers that utilize three layers of material while still providing a sufficient size of each layer for adequate purification of the fluid via removal of at least one target element from the fluid.

When the vessel 301 is in its on-stream state, the first layer of material 605 can be considered an upstream layer of material UL and the third layer of material 611 can be considered a downstream layer of material DL relative to the first layer of material 605. A first flow bypass prevention mechanism 900 can be positioned between these layers. A second flow bypass prevention mechanism 900 can also be positioned between the third layer of material 611 and the second layer of material 609. The second layer of material can be considered the downstream layer of material DL and the third layer of material 611 can be considered the upstream layer of material UL for the second flow bypass prevention mechanism.

In other embodiments, a flow bypass prevention mechanism 900 can be positioned so it has a first side in which extendable material (e.g. extendable member 904) extends between the first layer of material 605 and the third layer of material 611 and a second side that has extendable material (e.g. extendable member 904) that extends between the second layer of material 609 and the third layer of material 611.

The first, second, and third layers of material 605, 609, and 611 can include different material. These layers can include silica gel and/or alumina for one of the layers, a calcium X type zeolite for one of the layers, and the 13X zeolite for another one of the layers. Other examples of material for the different layers include different types of materials suitable for removal of different target elements or removal of different combinations of target elements. For instance one of the layers can include metal oxide material (e.g. copper oxide-manganese oxide mixtures) to remove H2 and CO from the fluid as yet another suitable option for material that can be used in any of the first, second, and third layers 605, 609, and 611.

Referring to FIG. 8, the vessel 301 can include a radial bed having three or more adsorbent types for material and also utilize a reduced number of middle screens as compared to conventional radial adsorbers. The vessel 301 can include an inner cavity that has a flow distributor plate 304 to divert fluid received via inlet 202 so that the fluid is passed along a flow path 716. The fluid can first be diverted via the flow distributor plate 304 so that fluid from the inlet 202 is passed into an inlet of a first outer annular conduit 703 that has at least one outlet opening adjacent an outer side of a first layer of material 705 retained within a first receptacle that has at least one hole at its inner side and at least one hole at its outer side so fluid is passable from the outlet of the first outer annular conduit 703, through the first layer of material 705, and into the second layer of layer 709. The second layer of material 709 can be retained within a second receptacle that is positioned inwardly of the first layer of material 705 within the vessel 301. The second receptacle can have at least one hole at its outer side adjacent the inner side of the first layer of material 705 and also have at least one hole at its inner side adjacent a first inner conduit 704 so that fluid is passable from the first layer 705, through the second layer 709, and into the first inner conduit 704 via at least one inlet opening of the first inner conduit 704 adjacent the inner side of the second layer of material 709.

The first inner conduit 704 can be positioned to guide fluid from the second layer 709 to an inner side of a third layer of material 711 retained within a third receptacle of the vessel that has at least one hole at its inlet side to receive fluid from at least one outlet of the first inner conduit 704 adjacent the inlet side of the third layer of material 711. The third receptacle that retains the third layer of material 711 can also have at least one hole at its outlet side adjacent an inlet of a second outer conduit 707 so that fluid is passable through the third layer of material 711 along the flow path 716 and then passable into the second outer conduit 707 via an inlet of the second outer conduit 707 adjacent the outlet side of the third layer of material 711.

The third layer of material 711 can have one or more baffles or other type of flow distribution devices positioned therein so that fluid from the second layer of material 709 can be guided within the third layer of material 711 for contact with a larger portion of the bed of material or an entirety of the bed of material within the third layer of material 711. The use of a flow distribution mechanism in the third layer of material 711 can help improve the operational efficiency of the third layer of material 711 by avoiding some outer regions of the third layer of material 711 having less or no contact with fluid as it passes through the third layer of material 711.

The second outer conduit 707 can be in fluid communication with the outlet 210 of the vessel so that the fluid can be output from the vessel 301 after the fluid has been passed through the first, second, and third layers of materials 705, 709, and 711 to be purified.

It should be understood that the first inner conduit 704, the first outer conduit 703, and second outer conduit 707 can each be structured as conduit-type structures within the vessel cavity or vessel chamber that can each define a passageway for fluid within the cavity or chamber of the vessel for guiding the fluid along a flow segment of a flow path within the vessel.

There can be a flow path 716 of the vessel 301 that is configured for passing fluid between inner and outer regions of the chamber of the vessel 301 for passing through the layers of material. The vessel 301 can be configured so that flow path 716 is defined so that the flow path 716 includes the following flow segments when operating in the on-stream state:

(i) the fluid passing from the inlet 202 into the vessel 301 along a first flow segment of flow path 716, (ii) then through the first outer conduit 703 defining an initial fluid feed path for the fluid along a second flow segment of flow path 716, (iii) then through a first layer of material 705 along a third flow segment of flow path 716, (iv) then through a second layer of material 709 adjacent the first layer 705 that is positioned inward of the first layer 705 and is located closer to a center of the vessel as compared to the first layer 705 along a fourth flow segment of flow path 716, (v) then passed out of the second layer of material 709 to the first inner conduit 704 along a fifth flow segment of flow path 716, (vi) then from the first inner conduit 704 to the third layer of material 711 positioned downstream of the second layer 709 (e.g. above the second layer for vertical oriented vessels or positioned to a downstream side of the second layer downstream of the second layer for a horizontally oriented vessel) along a sixth flow segment of the flow path 716, (vii) then passed out of the third layer of material 711 to a second outer conduit 707 along a seventh flow segment of the flow path 716, and (viii) then passed from the second outer conduit 707 to the outlet 210 of the vessel 301 along an eighth flow segment of flow path 716 for outputting purified fluid from the vessel 301 after that fluid has been passed through and contacted the first, second, and third layers of material 705, 709, and 711.

The first and second receptacles that retain the first and second layers 705 and 709 can be defined within the cavity of the vessel via an assembly of screens. There can be a first outer screen 621, a second inner screen 622 and a third intermediate screen 623 between the first outer screen 621 and the second inner screen 622. In some embodiments, these screens can define annular shaped structures (e.g. tubes, etc.) for facilitating retention of material to define multiple material layers. This arrangement can allow for a reduced number of middle screens as compared to conventional radial adsorbers that utilize three layers of material while still providing a sufficient size of each layer for adequate purification of the fluid via removal of at least one target element from the fluid.

The third layer 711 for the embodiment shown in FIG. 8 can be retained within the third receptacle via a support of the third receptacle. The support of the third receptacle can be an upper support for vertically oriented vessels or a sideward support for horizontally oriented vessels 301. The support of the third receptacle can be attached to the first, second and third screens 621, 622, and 623 to provide support for those screens and help retain the positions of those screens.

It should be appreciated that when the vessel 301 is in its on-stream state, the first layer of material 705 can be considered an upstream layer of material UL and the third layer of material 711 can be considered a downstream layer of material DL relative to the first layer of material 705. A first flow bypass prevention mechanism 900 can be positioned between these layers. A second flow bypass prevention mechanism 900 can also be positioned between the third layer of material 711 and the second layer of material 709. The second layer of material 709 can be considered the downstream layer of material DL and the third layer of material 711 can be considered the upstream layer of material UL for the second flow bypass prevention mechanism.

In other embodiments, a flow bypass prevention mechanism 900 can be positioned so it has a first side in which extendable material (e.g. an extendable member 904) extends between the first layer of material 705 and the third layer of material 711 and a second side that has extendable material 904 (e.g. (e.g. an extendable member 904) that extends between the second layer of material 709 and the third layer of material 711.

The first, second, and third layers of material 705, 709, and 711 can include different material. These layers can include silica gel and/or alumina for one of the layers, a calcium X type zeolite for one of the layers, and the 13X zeolite for another one of the layers. Other examples of material for the different layers include different types of materials suitable for removal of different target elements or removal of different combinations of target elements. For instance one of the layers can include copper oxide-manganese oxide mixtures to remove hydrogen (H2) and carbon monoxide (CO) from the fluid as yet another suitable option for material that can be used in any of the first, second, and third layers 705, 709, and 711.

Referring to the embodiment shown in FIG. 9, the vessel 301 can include an inner cavity that has an inner cavity configuration so that fluid received via inlet 202 is passed along a flow path 816. The vessel 301 can include a radial bed having three or more adsorbent types for material and also utilize a reduced number of middle screens as compared to conventional radial adsorbers.

The vessel 301 of the embodiment shown in FIG. 9 can include an inner cavity that has a flow distributor plate 304 to divert fluid received via inlet 202 so that the fluid is passed along a flow path 816. The fluid can first be diverted via the flow distributor plate 304 so that fluid from the inlet 202 is passed into an inlet of a first outer annular conduit 803 that has at least one outlet opening adjacent an outer side of a first layer of material 805 retained within a first receptacle that has at least one hole at its inner side and at least one hole at its outer side so fluid is passable from the outlet of the first outer annular conduit 803, through the first layer of material 805, and into the second layer of layer 809. The second layer of material 809 can be retained within a second receptacle that is positioned inwardly of the first layer of material 805 within the vessel 301. The second receptacle can have at least one hole at its outer side adjacent the inner side of the first layer of material 805 and also have at least one hole at its inner side adjacent a first inner conduit 804 so that fluid is passable from the first layer 805, through the second layer 809, and into the first inner conduit 804 via at least one inlet opening of the first inner conduit 804 adjacent the inner side of the second layer of material 809.

The first inner conduit 804 can be positioned to guide fluid from the second layer 809 to an inlet side of a third layer of material 811 retained within a third receptacle of the vessel that has at least one hole at its inlet side (e.g. inlet side 812) to receive fluid from at least one outlet of the first inner conduit 804 adjacent the inlet side of the third layer of material 811. The third receptacle that retains the third layer of material 811 can also have at least one hole at its outlet side (e.g. outlet side 813) adjacent an inlet of a second outer conduit 807 so that fluid is passable through the third layer of material 811 along the flow path 816 and then passable into the second outer conduit 807 via an inlet of the second outer conduit 807 adjacent the outlet side of the third layer of material 811. The second outer conduit 807 can be in fluid communication with the outlet 210 of the vessel so that the fluid can be output from the vessel 301 after the fluid has been passed through the first, second, and third layers of materials 805, 809, and 811 to be purified.

The third layer of material 811 can be retained within a conical structure 814 that defines the third receptacle. The conical structure can have an inlet side 812 and an outlet side 813. Fluid can be output from the outlet side 813 for passing into an outer conduit 807 and/or for being passed through the outlet 210 of the vessel that can be in fluid communication with the outlet side 813. The outlet side 813 can be larger than the inlet side 812 in such a configuration. It is contemplated that other embodiments of the third receptacle can be configured so that the outlet side 813 is the same or a similar size to the inlet side 812 or that the inlet side 812 can be larger than the outlet side 813.

It should be understood that the first inner conduit 804, the first outer conduit 803, and second outer conduit 807 can each be structured as conduit-type structures within the vessel cavity or vessel chamber that can each define a passageway for fluid within the cavity of the vessel to guide the fluid along a flow segment of the flow path within the vessel 301.

There can be a flow path 816 of the vessel 301 that is configured for passing fluid between inner and outer regions of the chamber of the vessel 301 for passing through the layers of material. The vessel 301 can be configured so that flow path 816 is defined so that the flow path 816 includes the following flow segments when operating in the on-stream state:
 (i) the fluid passing from the inlet 202 into the vessel 301 along a first flow segment of flow path 816,
 (ii) then through the first outer conduit 803 defining an initial fluid feed path for the fluid along a second flow segment of flow path 816,
 (iii) then through a first layer of material 805 along a third flow segment of flow path 816,
 (iv) then through a second layer of material 809 adjacent the first layer 805 that is positioned inward of the first layer 805 and is located closer to a center of the vessel as compared to the first layer 805 along a fourth flow segment of flow path 816,
 (v) then passed out of the second layer of material 809 to the first inner conduit 804 along a fifth flow segment of flow path 816,
 (vi) then from the first inner conduit 804 to the third layer of material 811 positioned downstream of the second layer 809 (e.g. above the second layer for vertical oriented vessels or positioned to a downstream side of the second layer downstream of the second layer for a horizontally oriented vessel) along a sixth flow segment of the flow path 816,
 (vii) then passed out of the third layer of material 811 to a second outer conduit 807 along a seventh flow segment of the flow path 816, and
 (viii) then passed from the second outer conduit 807 to the outlet 210 of the vessel 301 along an eighth flow segment of flow path 816 for outputting purified fluid from the vessel 301 after that fluid has been passed through and contacted the first, second, and third layers of material 805, 809, and 811.

The first and second receptacles that retain the first and second layers 805 and 809 can be defined within the cavity of the vessel via an assembly of screens. There can be a first outer screen 621, a second inner screen 622 and a third intermediate screen 623 between the first outer screen 621 and the second inner screen 622. In some embodiments, these screens can define annular shaped structures (e.g. tubes, etc.) for facilitating retention of material to define a plurality of material layers. This arrangement can allow for a reduced number of intermediate screens as compared to conventional radial adsorbers that utilize three layers of material while still providing a sufficient size for each layer to allow for a sufficient residence time of the fluid within each layer for adequate purification of the fluid via removal of at least one target element from the fluid.

The third layer 811 for the embodiment shown in FIG. 9 can be retained within the third receptacle via a support 810 of the third receptacle. The support of the third receptacle can be an upper support for vertically oriented vessels or a sideward support for horizontally oriented vessels 301. The support 810 of the third receptacle can be attached to the first, second and third screens 621, 622, and 623 to provide support for those screens and help retain the positions of those screens within the vessel chamber.

It should be appreciated that when the vessel 301 is in its on-stream state, the first layer of material 805 can be considered an upstream layer of material UL and the third layer of material 811 can be considered a downstream layer of material DL relative to the first layer of material 805. A first flow bypass prevention mechanism 900 can be positioned between these layers. A second flow bypass prevention mechanism 900 can also be positioned between the third layer of material 811 and the second layer of material 809. The second layer of material 809 can be considered the downstream layer of material DL and the third layer of material 811 can be considered the upstream layer of material UL for the second flow bypass prevention mechanism.

In other embodiments, a flow bypass prevention mechanism 900 can be positioned so it has a first inner side in which extendable material 904 (e.g. an extendable member 904) extends between the first layer of material 805 and the third layer of material 811 and/or support 810 and a second side that has extendable material (e.g. extendable member 904) that extends between the second layer of material 809 and the third layer of material 811 and/or support 810.

The first, second, and third layers of material 805, 809, and 811 can include different material. These layers can include silica gel and/or alumina for one of the layers, a calcium X type zeolite for one of the layers, and the 13X zeolite for another one of the layers. Other examples of material for the different layers include different types of materials suitable for removal of different target elements or removal of different combinations of target elements. For instance one of the layers can include copper oxide-manganese oxide mixtures to remove hydrogen (H2) and carbon monoxide (CO) from the fluid as yet another suitable option for material that can be used in any of the first, second, and third layers 805, 809, and 811.

When the adsorber bed for embodiments of the radial adsorber 200 are put into operation, the layers of material can experience material settling. This can reduce a dimension of the layer (e.g. length of a horizontally oriented vessel layer or height of a vertically oriented layer). This settling effect can occur due to the packing of the material becoming denser as a result of fluid being passed through the layers. It is contemplated that the adsorbent compartments (e.g. receptacles) for the layers of the vessel 301 for all the embodiments discussed herein can be susceptible to this phenomenon, which could create a flow bypass issue in which some portion of fluid may bypass a layer due to a reduction in size of the layer that may occur as a result of the settling effect. This can be a problem for both fluid purification flows when the adsorber is in an on-stream state and regeneration flows that may pass through the vessel when the adsorber is in an off-stream state.

As can be appreciated from FIGS. 2-9, we have developed a flow bypass prevention mechanism 900 to address such a problem to avoid such bypass flow issues that can be utilized in all of the embodiments discussed herein to avoid such problems or at least significantly mitigate such issues. An exemplary embodiment of our flow bypass prevention mechanism 900 that can be used in our embodiments of the radial adsorber 200 may best be appreciated from FIGS. 10-11.

Figure 10:
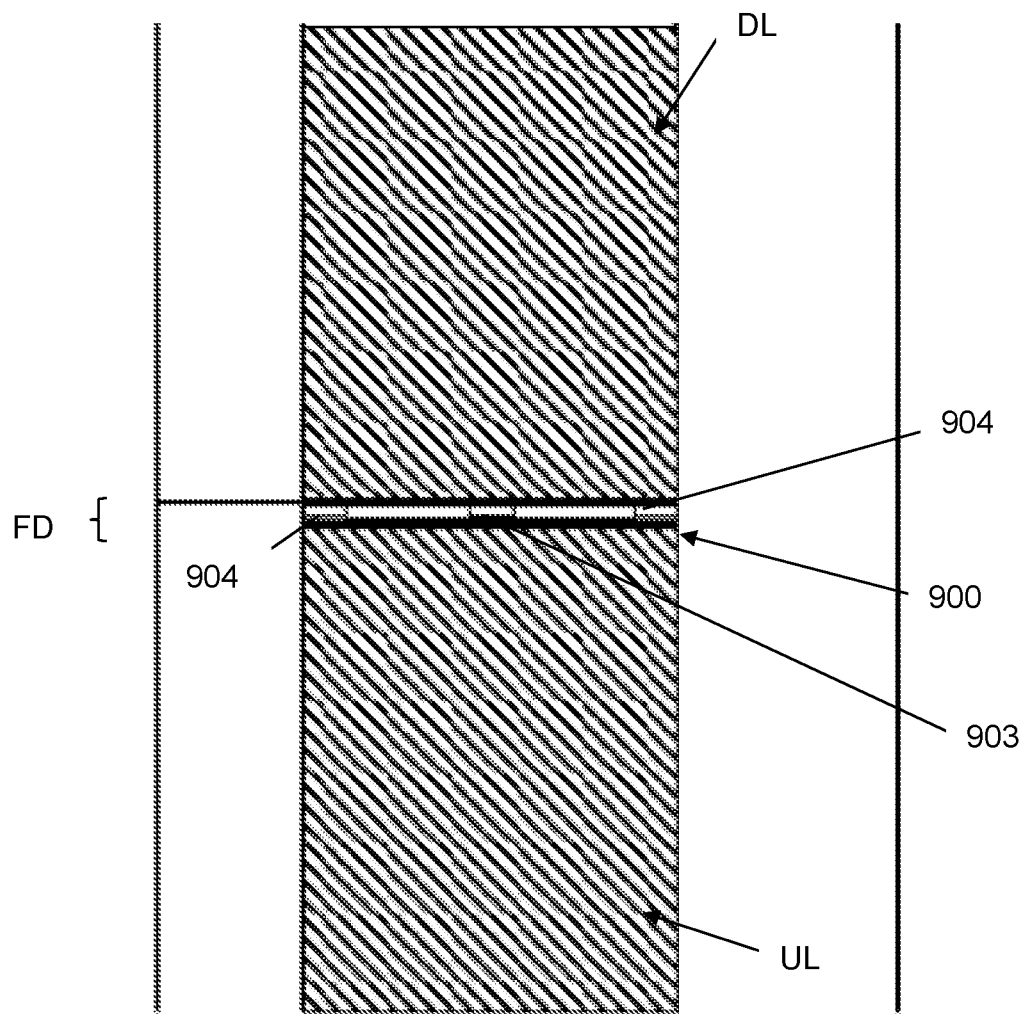
FIG. 10 is a schematic view illustrating an exemplary flow bypass prevention mechanism 900 utilizable in the embodiments of the radial adsorber shown in FIGS. 1-9. The layer separator can be positionable between adjacent adsorbent layers in a first position, which can be considered a compressed position or a retracted position.
Figure 11:
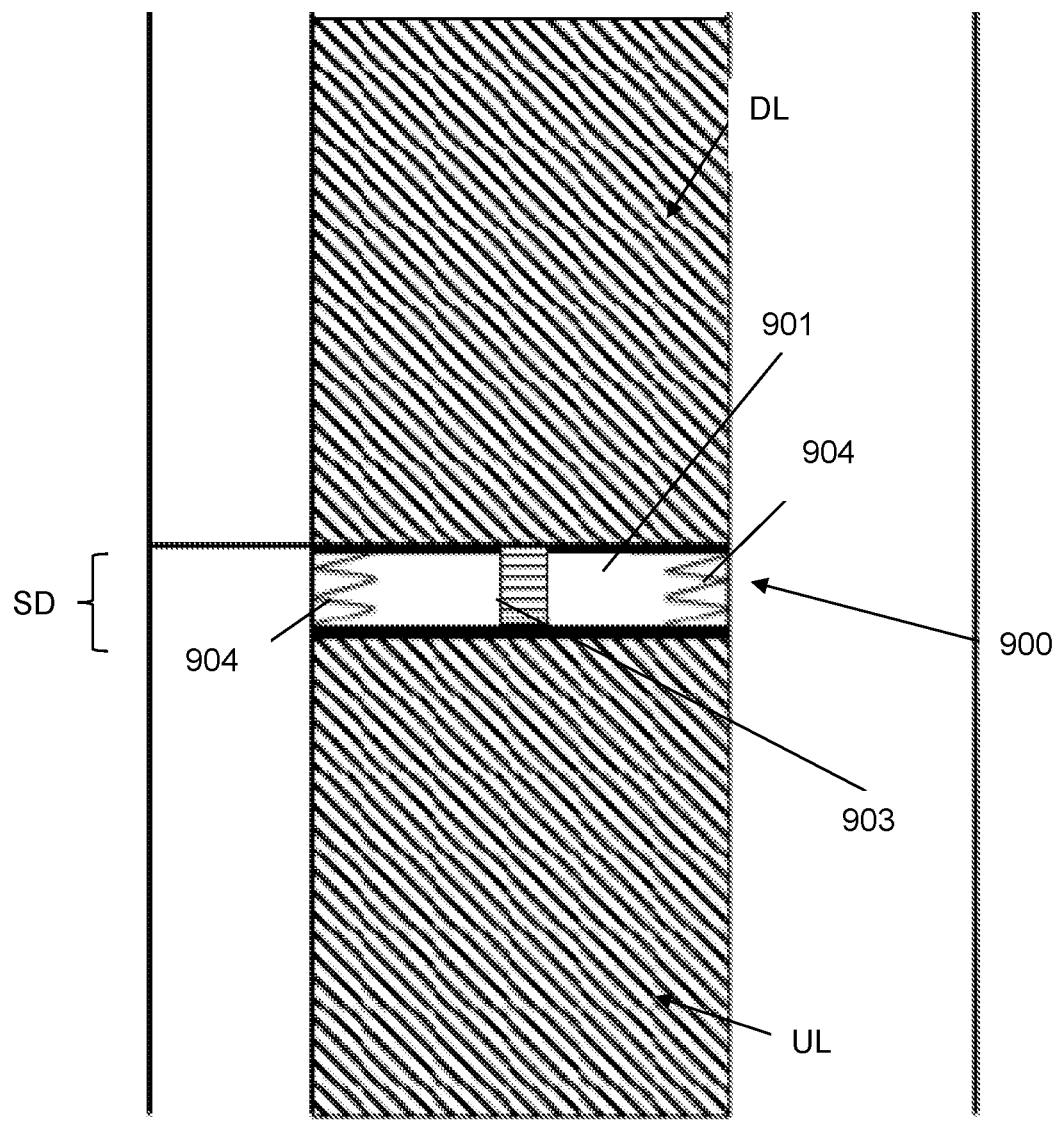
FIG. 11 is a schematic view similar to FIG. 10 illustrating the exemplary flow bypass prevention mechanism 900 positionable between adjacent layers in a second position, which can be considered an extended state.

Referring to FIGS. 10-11, the flow bypass prevention mechanism 900 can be positioned between a downstream layer DL of material and an upstream layer UL of material in the chamber or cavity of the vessel 301 (e.g. as also indicated in FIGS. 2-9). In some vertically oriented vessels, the downstream layer DL can be above the upstream layer UL.

The flow bypass prevention mechanism 900 can be configured as a layer separator that includes at least one spring 903 that is biased to extend outwardly (e.g. a coil spring that can compress to a shorter length and is biased to extend to a longer length, an elongated elastomeric spring that can resiliently compress along its length and is biased to extend outwardly to a longer length, etc.). The flow bypass prevention mechanism 900 can also include at least one extendable side member 904 at its inner and outer sides that are opposite the inner spring(s) 903 to define a compartment 901 in which each and every one of the springs 903 is positioned between the upstream and downstream layers of material UL and DL.

The extendable member 904 can be composed of flexible metal, a high temperature rubber sheet of material, a high temperature elastomeric sheet of material, a flexible sheet of material (e.g. a rubber mat, a rubber sheet, an elastomeric sheet, etc.), foldable metal that can be configured to fold into a compressed configuration and unfold into an extended configuration, or other type of foldable material or stretchable material that can extend from a retracted position to an extended position as the spring(s) 903 extend from a compressed position and also withstand the operational conditions within the vessel 301.

The extendable member 904 can be an annular shaped member in some embodiments. For instance, in some embodiments each extendable member 904 can be an O-ring or have a ring or annular type structure (e.g. annular hexagonal structure, etc.). In other embodiments, each extendable member 904 can be a sheet of material or a sheet of folded material that can be stretched into a less folded state or an unfolded state when the member extends. In yet other embodiments, there can be multiple extendable members 904 that are positioned for defining different sides of the compartment 901 (e.g. inner and outer sides of the compartment 901).

A first end of each spring can engage the upstream layer UL and the second opposite end of the spring 903 can engage the downstream layer DL within the compartment 901 defined by at least one extendable member 904. For example, a first end of each spring 903 can engage (e.g. contact) a first side of a screen or receptacle of the upstream layer UL and the second end of each spring 903 can engage (e.g. contact) the first side of a screen or receptacle of the downstream layer DL that faces toward the upstream layer UL.

After material is filled into the upstream and downstream layers UL and DL, the weight of the material and positioning of the receptacles and/or screens for those layers of material can cause the spring(s) 903 and extendable member(s) 904 to retract to a retracted position, as shown in FIG. 10. In this position, upstream and downstream layers UL and DL can be separated by a first distance FD. In this retracted position, the extendable member(s) 904 can be in a folded or retracted state. This retracted position of the extendable member(s) 904 and spring(s) 903 can be the initial position of the layers and flow bypass prevention mechanism 900 when the adsorber is first installed in a facility for use.

After fluid is passed through the adsorber 200, the material of the downstream and upstream layers DL and UL can settle and become more densely packed due to the settling effect. The spring(s) 903 and extendable member(s) 904 can function to prevent flow bypass issues by extending in response to this effect as each spring is biased to extend out of its retracted position to a more extended position and the extendable member(s) 904 is able to extend from a folded or retracted position to a more extended position that is less folded. The extension of the extendable member(s) 904 driven by the spring(s) 903 can cause the size of the compartment 901 to enlarge to fill the space that would otherwise have been created via the material settling. In this position, upstream and downstream layers UL and DL can be separated by a second distance SD that is greater than the first distance FD at which these layers are separated for the initial position shown in FIG. 10. The extendable member(s) 904 being extended at the sides to a more extended position that is driven by extension of the spring(s) 903 can block the fluid and ensure the fluid is passed through the material and does not bypass the layer of material.

The extendable member(s) 904 can extend between different layers and/or between a support (e.g. support 810) and a layer. In some embodiments, the periphery of a compartment 901 in which at least one spring 903 is positioned can be defined by an annular shaped extendable member extending from the same downstream layer DL to the same upstream layer UL. In other embodiments, a first inner side can have a first annular extendable member 904 that extends from a downstream layer DL to an upstream layer UL and/or a support (e.g. support 810) of that upstream layer and a second outer side of compartment 901 can have a second annular extendable member 904 extending from a different downstream layer DL to the same upstream layer UL or a support (e.g. support 810) of the upstream layer.

It should be appreciated that the flow bypass prevention mechanism 900 can have multiple extended positions to account for a dynamic change to the dimension of the layers that may change due to the settling effect. This can allow the flow bypass mechanism 900 to extend continuously in response to the layers becoming more densely packed during operation so that flow bypass that could arise due to material settling effects is continuously mitigated during operation of the adsorber 200.

Referring to FIGS. 1-9, the vessel 301 can also include bleed outlets 321 for different layers to allow a portion of fluid passed through the vessel to be output from the vessel 301 after the fluid has only passed through less than all the layers of material within the vessel (e.g. one layer of material when two layers are present or 1-2 layers of material when three layers are present, etc.). For example, at least one bleed outlet 321 (shown in broken line) can be positioned for outputting a portion of fluid after having only passed through the first layer or after having passed through first and second layers (but not yet a third layer). This portion of the treated fluid can then be routed along a bleed output fluid flow 121 from the bleed outlet 321 to a plant device that does not require fluid to be more fully purified via passing through other layers retained in the vessel 301. The use of one or more bleed outlets 321 can allow the adsorber 200 to be utilized to treat an input fluid for multiple different process streams having different fluid compositional requirements to provide greater operational flexibility for a plant operator.

The bleed outlets 321 can include a valve or other type of opening and closing mechanism that can allow the bleed outlets 321 to be opened or closed to generate the bleed output fluid flow 121 when such a flow may be desired. For instance, the bleed outlets 321 may be closed during the regeneration phase and can be opened when the adsorber 200 operates in the on-stream phase to distribute the bleed output fluid flow(s) 121. Bleed outlets 321 may also be used to feed in additional regen gas at a specific temperature during the regeneration phase.

The material of the layers of material of the bed of the adsorber (e.g. first, second, and third layers, etc. such as layers 305, 405, 505, 605, 705, 805, 309, 408, 509, 609, 709, 809, 511, 611, 711, and 811, etc.) can be different types of material. For instance, the first layer, second layer, and/or third layer can each include a different component or combination of components from the following options: a molecular sieve, alumina, silica (e.g. silica gel), metal oxides, copper oxide-manganese oxide mixtures for carbon monoxide and hydrogen gas removal (CO/H2 removal),an adsorbent material or absorbent material (e.g. a catalyst) to remove nitrous oxide, an adsorbent material or absorbent material (e.g. a catalyst) to remove carbon monoxide, an adsorbent material or absorbent material (e.g. a catalyst) to remove carbon dioxide, an adsorbent material or absorbent material (e.g. a catalyst) to remove hydrogen, or an adsorbent material or absorbent material (e.g. a catalyst) to remove other target element or combination of target elements from a fluid (e.g. a gas having a mixture of gaseous compounds, air, etc.) passed through the layers. The material of each of the layers can be solid particulate material having pores for facilitating adsorbing and/or absorbing one or more materials from a fluid (e.g. a gas) pass through the material.

It should be appreciated that the embodiments of the radial adsorber can be configured so that a flow path for the fluid passing through the chamber passes through different layers of material in different radial directions (e.g. a first radial direction and a second radial direction). A first radial direction of fluid flow can be a flow segment of the flow path in which a fluid passes from an outer region to an inner region of the chamber when passing through one or more layers of material. A second radial direction of fluid flow can be a flow segment of the flow path in which a fluid passes from the inner region to the outer region of the chamber when passing through one or more layers of material. In other embodiments, a first radial direction of fluid flow can be a flow segment of the flow path in which the fluid passes from the inner region to an outer region of the chamber when passing through one or more layers of material and the second radial direction of fluid flow can be a flow segment of the flow path in which the fluid passes from the outer region to the inner region of the chamber when passing through one or more layers of material.

In some embodiments, the chamber of the vessel can be defined so that at least one flow segment of the flow path can flow in an axial direction that is transverse or perpendicular to a first radial direction and/or a second radial direction as the fluid flows within the chamber from the inlet 202 toward the outlet 210 (e.g. flows vertically through at least one layer of material such as in the embodiments shown in FIGS. 8 and 9).

Embodiments of the radial adsorbers 200 such as the embodiments discussed herein can be configured to avoid or reduce the use of an intermediate screen element that can be complex in design and difficult to manufacture. The removal of an intermediate screen element (or reduction of the number of such elements that may be needed) can significantly simplify radial adsorber designs and greatly reduce costs for manufacture and operation of the radial adsorbers. For instance, stresses that act on intermediate screen elements of conventional radial adsorbers are no longer an issue in embodiments of our radial adsorber that can avoid use of such elements. Such stresses can also be more easily accounted for in embodiments that allow for a reduction in the number of required intermediate screens.

Further, the positioning of the separate material layers can be provided so that these layers have a sufficient size to allow those layers to significantly or completely remove one or more desired target components of the fluid (e.g. water, CO2, N2O, H2, CO, etc.) by the fluid being passed through the layer and being contacted with the solid particulate material of the layer. This can help avoid increased fabrication, maintenance, and operational costs that can be incurred related to addressing such thermal variation and stress issues of multi-layered conventional radial adsorbers having intermediate screens while also providing improved purification operation of the adsorber that can avoid detrimental fluidization effects. Such effects and impact can be further enhanced by use of an embodiment of our flow bypass prevention mechanism 900 as discussed herein.

It should be appreciated that modifications to the embodiments explicitly shown and discussed herein can be made to meet a particular set of design objectives or a particular set of design criteria. For instance, the arrangement of valves, piping, and other conduit elements (e.g. conduit connection mechanisms, tubing, seals, etc.) for interconnecting different units of the plant for fluid communication of the flows of fluid between different units can be arranged to meet a particular plant layout design that accounts for available area of the plant, sized equipment of the plant, and other design considerations. As another example, the flow rate, pressure, and temperature of the fluid passed through the radial adsorber as well as passed through other plant elements can vary to account for different plant design configurations and other design criteria. As yet another example, the number of radial adsorbers in the adsorption system 107 and how they are arranged can be adjusted to meet a particular set of design criteria. As yet another example, the material composition for the different structural components of the radial adsorber 200, adsorption system 107, and plant 1 can be any type of suitable materials as may be needed to meet a particular set of design criterial.

It should be appreciated that embodiments of the plant 1 can be configured as an air separation plant or other type of plant in which at least one radial adsorber 200 can be utilized. The plant. adsorption system, and the radial adsorber can each be configured to include process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the plant, etc.).

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of the radial adsorber, adsorption system, plants having an adsorption system utilizing one or more of the radial adsorbers, and methods of making and using the same have been shown and described above, it is to be distinctly understood that the invention is not limited thereto but may be otherwise variously embodied and practiced within the scope of the following claims.

What is claimed is:

1. A radial adsorber comprising:
   a vessel, the vessel having a chamber, an inlet in fluid communication with the chamber and an outlet in fluid communication with the chamber;
   a first layer of material positioned adjacent to a second layer of material within the chamber, the first layer of material including a first material and the second layer of material including a second material that is different from the first material;
   the vessel also having at least one flow guiding structure defined within or positioned within the chamber for guiding fluid within the chamber and through the layers of material, the at least one flow guiding structure configured so that the fluid passes from an outer region of the chamber to an inner region of the chamber to pass through the layers of material and/or pass from the inner region to the outer region to pass through the layers of material; and
   wherein the at least one flow guiding structure includes a first outer conduit positioned to receive fluid from the inlet and guide the fluid to an outer side of the first layer of material and a first inner conduit positioned to receive fluid from an inner side of the first layer of material to guide the fluid to an inner side of the second layer of material.

2. The radial adsorber of claim 1, comprising:
   a first flow bypass prevention mechanism positioned between the first layer of material and the second layer of material.

3. An adsorption system comprising a first adsorber and a second adsorber arranged to operate in parallel so that when the first adsorber is in an on-stream state the second adsorber is in an off-stream state and when the second adsorber is in an on-stream state, the first adsorber is in an off-stream state;
   the first adsorber configured to purify fluid passed through the first adsorber when in the on-stream state of the first adsorber, the first adsorber configured to receive a regeneration flow of fluid to undergo adsorbent regeneration when in the off-stream state of the first adsorber;
   the second adsorber configured to purify fluid passed through the second adsorber when in the on-stream state of the second adsorber, the second adsorber configured to receive a regeneration flow of fluid to undergo adsorbent regeneration when in the off-stream state of the second adsorber;
   the first adsorber being a radial adsorber of claim 1, and the second adsorber also being a radial adsorber of claim 1.

4. A plant comprising the adsorption system of claim 3, the plant also comprising:
   a compressor for compressing the fluid to feed the fluid to the adsorption system.

5. A radial adsorber comprising:
   a vessel, the vessel having a chamber, an inlet in fluid communication with the chamber and an outlet in fluid communication with the chamber;
   a first layer of material positioned adjacent to a second layer of material within the chamber, the first layer of material including a first material and the second layer of material including a second material that is different from the first material;
   the vessel also having at least one flow guiding structure defined within or positioned within the chamber for guiding fluid within the chamber and through the layers of material, the at least one flow guiding structure configured so that the fluid passes from an outer region of the chamber to an inner region of the chamber to pass through the layers of material and/or pass from the inner region to the outer region to pass through the layers of material; and
   wherein the at least one flow guiding structure includes a first outer conduit positioned to receive fluid from the inlet and guide the fluid to an outer side of the first layer of material, a first inner conduit positioned to receive fluid from an inner side of the first layer of material to guide the fluid to an inner side of the second layer of material, and a second outer conduit positioned to receive fluid from an outer side of the second layer of material and guide the fluid to the outlet of the vessel.

6. The radial adsorber of claim 5, comprising:
   a first flow bypass prevention mechanism positioned between the first layer of material and the second layer of material.

7. An adsorption system comprising a first adsorber and a second adsorber arranged to operate in parallel so that when the first adsorber is in an on-stream state the second adsorber is in an off-stream state and when the second adsorber is in an on-stream state, the first adsorber is in an off-stream state;
   the first adsorber configured to purify fluid passed through the first adsorber when in the on-stream state of the first adsorber, the first adsorber configured to receive a regeneration flow of fluid to undergo adsorbent regeneration when in the off-stream state of the first adsorber;
   the second adsorber configured to purify fluid passed through the second adsorber when in the on-stream state of the second adsorber, the second adsorber configured to receive a regeneration flow of fluid to undergo adsorbent regeneration when in the off-stream state of the second adsorber;
   the first adsorber being a radial adsorber of claim 5, and the second adsorber also being a radial adsorber of claim 5.

8. A radial adsorber comprising:
   a vessel, the vessel having a chamber, an inlet in fluid communication with the chamber and an outlet in fluid communication with the chamber;
   a first layer of material positioned adjacent to a second layer of material within the chamber, the first layer of material including a first material and the second layer of material including a second material that is different from the first material;
   the vessel also having at least one flow guiding structure defined within or positioned within the chamber for guiding fluid within the chamber and through the layers of material, the at least one flow guiding structure configured so that the fluid passes from an outer region of the chamber to an inner region of the chamber to pass through the layers of material and/or pass from the inner region to the outer region to pass through the layers of material;

wherein the at least one flow guiding structure includes one of:
(i) a first inner conduit positioned to receive fluid from the inlet and guide the fluid to an inner side of the first layer of material and a first outer conduit positioned to receive fluid from an outer side of the first layer of material to guide the fluid to an outer side of the second layer of material;
(ii) a first inner conduit positioned to receive fluid from the inlet and guide the fluid to an inner side of the first layer of material and a first outer conduit positioned to receive fluid from an outer side of the first layer of material to guide the fluid to an outer side of the second layer of material, and a second inner conduit positioned to receive fluid from an inner side of the second layer of material to guide the fluid to the outlet of the vessel;
(iii) a first outer conduit positioned to receive fluid from the inlet and guide the fluid to an outer side of the first layer of material and a first inner conduit positioned to receive fluid from an inner side of the first layer of material to guide the fluid to an inner side of the second layer of material; and
(iv) a first outer conduit positioned to receive fluid from the inlet and guide the fluid to an outer side of the first layer of material, a first inner conduit positioned to receive fluid from an inner side of the first layer of material to guide the fluid to an inner side of the second layer of material, and a second outer conduit positioned to receive fluid from an outer side of the second layer of material and guide the fluid to the outlet of the vessel; and a first flow bypass prevention mechanism positioned between the first layer of material and the second layer of material, wherein the first flow bypass prevention mechanism comprises:
at least one spring;
a first extendable member positioned to at least partially define a compartment;
the at least one spring positioned in the compartment, a first end of each spring engaging the first layer of material and a second end of the at least one spring engaging the second layer of material so that the first extendable material extends via the at least one spring in response to a settlement effect resulting from the first material and/or the second material becoming more densely packed as a result of fluid being passing through the first layer of material and the second layer of material.

9. A radial adsorber comprising:
a vessel, the vessel having a chamber, an inlet in fluid communication with the chamber and an outlet in fluid communication with the chamber;
layers of material positioned within the chamber, the layers of material including a first layer of material positioned adjacent a second layer of material within the chamber, the first layer of material including a first material and the second layer of material including a second material that is different from the first material, the layers of material also including a third layer of material positioned within the chamber, the third layer of material comprising a third material that differs from the first material and also differs from the second material;

the vessel also having at least one flow guiding structure defined within or positioned within the chamber for guiding fluid within the chamber and through the layers of material, the at least one flow guiding structure configured so that the fluid passes from an outer region of the chamber to an inner region of the chamber to pass through the layers of material and/or pass from the inner region to the outer region to pass through the layers of material;

wherein the at least one flow guiding structure includes one of:
(i) a first inner conduit positioned to receive fluid from the inlet and guide the fluid to an inner side of the first layer of material and a first outer conduit positioned to receive fluid from an outer side of the second layer of material to guide the fluid to an outer side of the third layer of material to pass the fluid through the third layer of material; and
(ii) a first outer conduit positioned to receive fluid from the inlet and guide the fluid to an outer side of the first layer of material and a first inner conduit positioned to receive fluid from an inner side of the second layer of material to guide the fluid to an inner side of the third layer of material to pass the fluid through the third layer of material.

10. The radial adsorber of claim 9, wherein the at least one flow guiding structure includes (i) the first inner conduit positioned to receive fluid from the inlet and guide the fluid to the inner side of the first layer of material and the first outer conduit positioned to receive fluid from the outer side of the second layer of material to guide the fluid to the outer side of the third layer of material.

11. The radial adsorber of claim 9, wherein the at least one flow guiding structure includes (ii) the first outer conduit positioned to receive fluid from the inlet and guide the fluid to the outer side of the first layer of material and the first inner conduit positioned to receive fluid from the inner side of the second layer of material to guide the fluid to the inner side of the third layer of material.

12. The radial adsorber of claim 9, wherein the at least one flow guiding structure includes (ii) the first outer conduit positioned to receive fluid from the inlet and guide the fluid to the outer side of the first layer of material, the first inner conduit positioned to receive fluid from the inner side of the second layer of material to guide the fluid to the inner side of the third layer of material; and also includes a second outer conduit positioned to receive fluid from the outer side of the third layer of material and guide the fluid to the outlet of the vessel.

13. The radial adsorber of claim 9, wherein the third layer of material is retained within a conical receptacle.

14. The radial adsorber of claim 13, wherein the inner side of the third layer is smaller in size than the outer side of the third layer of material.

15. The radial adsorber of claim 9, comprising:
a first flow bypass prevention mechanism positioned between the third layer of material and the first layer of material; and/or
a second flow bypass prevention mechanism positioned between the third layer of material and the second layer of material.

16. The radial adsorber of claim 15, wherein:

the first flow bypass prevention mechanism comprises:
- at least one first spring;
- a first extendable member to define at least a portion of a first compartment;
- the at least one first spring positioned in the first compartment, a first end of the first spring engaging the first layer of material and a second end of the first spring engaging the third layer of material so that the first extendable member extends via the at least one first spring in response to a settlement effect resulting from the first material and/or the third material becoming more densely packed as a result of fluid being passing through the first layer of material and the third layer of material; and the second flow bypass prevention mechanism comprises:
- at least one second spring;
- a second extendable member to define at least a portion of a second compartment;
- the at least one second spring positioned in the second compartment, a first end of the second spring engaging the second layer of material and a second end of the spring engaging the third layer of material so that the second extendable member extends via the at least one second spring in response to a settlement effect resulting from the second material and/or the third material becoming more densely packed as a result of fluid being passing through the second layer of material and the third layer of material.

17. An adsorption system comprising a first adsorber and a second adsorber arranged to operate in parallel so that when the first adsorber is in an on-stream state the second adsorber is in an off-stream state and when the second adsorber is in an on-stream state, the first adsorber is in an off-stream state;
- the first adsorber configured to purify fluid passed through the first adsorber when in the on-stream state of the first adsorber, the first adsorber configured to receive a regeneration flow of fluid to undergo adsorbent regeneration when in the off-stream state of the first adsorber;
- the second adsorber configured to purify fluid passed through the second adsorber when in the on-stream state of the second adsorber, the second adsorber configured to receive a regeneration flow of fluid to undergo adsorbent regeneration when in the off-stream state of the second adsorber;
- the first adsorber being a radial adsorber of claim 9, and the second adsorber also being a radial adsorber of claim 9.

18. A plant comprising the adsorption system of claim 17, the plant also comprising:
- a compressor for compressing the fluid to feed the fluid to the adsorption system.

* * * * *